United States Patent
Park et al.

(10) Patent No.: US 11,771,989 B2
(45) Date of Patent: Oct. 3, 2023

(54) METHOD FOR PROVIDING ITEM ENHANCEMENT SERVICE IN GAME

(71) Applicant: NCSOFT Corporation, Seongnam-si (KR)

(72) Inventors: Jong Min Park, Seongnam-si (KR); Song Hee So, Seongnam-si (KR); Joo Won Lee, Seongnam-si (KR); Yeon Gyeong Joo, Seongnam-si (KR); Jung Joon Kim, Seongnam-si (KR); Dan Bi Bae, Seongnam-si (KR); Jin Soo Seo, Seongnam-si (KR); Yoon Chae Lee, Seongnam-si (KR)

(73) Assignee: NCSOFT Corporation, Seoul (KR)

( * ) Notice: Subject to any disclaimer, the term of this patent is extended or adjusted under 35 U.S.C. 154(b) by 0 days.

(21) Appl. No.: 17/466,540

(22) Filed: Sep. 3, 2021

(65) Prior Publication Data
US 2022/0072426 A1     Mar. 10, 2022

(30) Foreign Application Priority Data

Sep. 8, 2020  (KR) .......................... 10-2020-0114642
Aug. 17, 2021 (KR) .......................... 10-2021-0108376

(51) Int. Cl.
*A63F 13/537*     (2014.01)
*G06F 3/0482*     (2013.01)
(Continued)

(52) U.S. Cl.
CPC ........ *A63F 13/537* (2014.09); *A63F 13/5375* (2014.09); *A63F 13/58* (2014.09);
(Continued)

(58) Field of Classification Search
CPC .. A63F 13/537; A63F 13/822; A63F 13/5375; A63F 2300/308; A63F 13/58;
(Continued)

(56) References Cited

U.S. PATENT DOCUMENTS 8,764,554 B2 * 7/2014 Blair ....................... A63F 13/63
                                                    463/23
8,821,260 B1 * 9/2014 DeSanti .................. A63F 13/69
                                                    463/43
(Continued)

FOREIGN PATENT DOCUMENTS

CN     109771953 A     5/2019
KR     10-1204318 B1   11/2012

OTHER PUBLICATIONS

Chotube, "[Blossom Revolution] 22 Hero Weapons Go to Multi-Enhance Cool," YouTube (May 13, 2019)<https://www.youtube.com/watch?v=buBTWJ2EJiU> (2 pages total of screenshots).
(Continued)

*Primary Examiner* — Justin R. Blaufeld
(74) *Attorney, Agent, or Firm* — Sughrue Mion, PLLC

(57) ABSTRACT

Provided is a method for operating an electronic device with a display. The method includes displaying, in a first area of a user interface for a game, a plurality of visual objects; in response to receiving first user inputs for selecting first visual objects, displaying the first visual objects in a second area of the user interface; while displaying, with the first visual objects, at least one second visual object indicating at least one resource for enhancement of items indicated by the first visual objects in the second area, receiving a second user input for executing the enhancement of the items; in response to receiving the second user input, displaying at least one visual effect for representing that the enhancement of the items is being executed; and based at least in part on completion of execution of the enhancement, displaying a result of the enhancement in the second area.

20 Claims, 24 Drawing Sheets

(51) Int. Cl.
*G06F 3/04817* (2022.01)
*G06F 3/04847* (2022.01)
*A63F 13/822* (2014.01)
*A63F 13/5375* (2014.01)
*A63F 13/58* (2014.01)
*A63F 13/69* (2014.01)

(52) U.S. Cl.
CPC ............ *A63F 13/69* (2014.09); *A63F 13/822* (2014.09); *G06F 3/0482* (2013.01); *G06F 3/04817* (2013.01); *G06F 3/04847* (2013.01); *A63F 2300/308* (2013.01); *G06F 2203/04803* (2013.01)

(58) Field of Classification Search
CPC ................... A63F 13/69; G06F 3/0482; G06F 2203/04803; G06F 3/04817; G06F 3/04847
See application file for complete search history.

(56) References Cited

U.S. PATENT DOCUMENTS

| | | | | |
|---|---|---|---|---|
| 8,836,719 | B2* | 9/2014 | Leung | G06Q 10/00 345/619 |
| 9,579,564 | B1* | 2/2017 | Yu | A63F 13/69 |
| 11,150,783 | B1* | 10/2021 | Kim | G06F 3/0482 |
| 2010/0280919 | A1* | 11/2010 | Everett | G06Q 30/00 705/28 |
| 2011/0265041 | A1* | 10/2011 | Ganetakos | A63F 13/533 715/834 |
| 2015/0080073 | A1* | 3/2015 | Naoi | A63F 13/2145 463/9 |
| 2015/0306494 | A1* | 10/2015 | Pieron | A63F 13/69 463/31 |
| 2016/0124518 | A1* | 5/2016 | Takahashi | G06F 3/04817 463/31 |
| 2017/0115831 | A1* | 4/2017 | Bosze | G06F 3/04886 |
| 2018/0093180 | A1* | 4/2018 | Yamanokuchi | G06F 3/04895 |
| 2018/0256988 | A1* | 9/2018 | Tsao | H04L 67/131 |
| 2019/0160379 | A1* | 5/2019 | Matsushita | A63F 13/58 |
| 2019/0366213 | A1* | 12/2019 | Zhou | A63F 13/533 |
| 2020/0401301 | A1* | 12/2020 | Gu | A63F 13/80 |
| 2021/0294472 | A1* | 9/2021 | Pan | A63F 13/5372 |
| 2021/0402306 | A1* | 12/2021 | Huang | A63F 13/795 |

OTHER PUBLICATIONS

Seulgi Ahn, "[Information] Training methods as diverse as the type of equipment! 'Equipment Management' function and its effect," invent.co.kr, Mar. 21, 2020, https://www.inven.co.kr/webzine/news/?news=235745&site=blessmobile (22 pages total).

Translation of Office Action dated Mar. 30, 2022 from the Korean Intellectual Property Office in KR Application No. 10-2021-0108376.

* cited by examiner

METHOD FOR PROVIDING ITEM ENHANCEMENT SERVICE IN GAME

This application is based on and claims priority under 35 U.S.C. § 119 to Korean Patent Application No. 10-2020-0114642, filed on Sep. 8, 2020 in the Korean Intellectual Property Office, and to Korean Patent Application No. 10-2021-0108376, filed on Aug. 17, 2021 in the Korean Intellectual Property Office, the entire disclosure of which is incorporated herein by reference.

FIELD

Example embodiments of the disclosure generally relate to a technique for providing an item enhancement service in game.

BACKGROUND

Along with recent developments of the computing environments and the networking environments, more and more people are enjoying various games with their computing devices and many of them are creating, processing, and operating a variety of contents in the games.

There are various contents that provide game users with the pleasure of games, but enhancement contents for some items in game, among others, are considered as one of the most popular contents, owing to the uncertainty about the enhancement itself as well as the game users' feeling of satisfaction from the enhanced performance of the corresponding item upon a success of the enhancement.

However, if such an item enhancement fails, the item may decrease in performance or the item itself may be lost. Therefore, in order to inspire the game users with a desire to play, it would be necessary to make the game users clearly recognize a risk of failure in the item enhancement in advance.

Furthermore, since selecting numerous items one by one to enhance each level may cause inconvenience to the game users and lose half their interests in playing the game, there is a need to provide an improved item enhancement service so that the game users can easily and conveniently make the item enhancement for various items up to a desired level.

SUMMARY

Various example embodiments provide an item enhancement service in game.

According to an aspect of an example embodiment, provided is a non-transitory computer readable storage medium storing one or more programs including: instructions which, when executed by at least one processor of an electronic device with a display, cause the electronic device to display, in a first area of a user interface for a game, a plurality of visual objects respectively indicating a plurality of items that are capable of enhancing in the game, via the display; to display, in a second area of the user interface next to the first area, the first visual objects, via the display in response to receiving first user inputs for selecting first visual objects from among the plurality of visual objects; to receive a second user input for executing the enhancement of the items while displaying, with the first visual objects, at least one second visual object indicating at least one resource for enhancement of items indicated by the first visual objects in the second area; to display at least one visual effect for representing that the enhancement of the items is being executed in response to receiving the second user input; and to display a result of the enhancement in the second area via the display after displaying the at least one visual effect, based at least in part on completion of execution of the enhancement.

According to an aspect of an example embodiment, provided is an electronic device including: at least one memory configured to store instructions, a display, and at least one processor, when executing the instructions, configured to display, in a first area of a user interface for a game, a plurality of visual objects respectively indicating a plurality of items that are capable of enhancing in the game, via the display; to display, in a second area of the user interface next to the first area, the first visual objects, via the display, in response to receiving first user inputs for selecting first visual objects from among the plurality of visual objects; to receive a second user input for executing the enhancement of the items while displaying, with the first visual objects, at least one second visual object indicating at least one resource for enhancement of items indicated by the first visual objects in the second area; to display at least one visual effect for representing that the enhancement of the items is being executed in response to receiving the second user input; and to display a result of the enhancement in the second area via the display after displaying the at least one visual effect, based at least in part on completion of execution of the enhancement.

According to an aspect of an example embodiment, provided is a method for operating an electronic device with a display, including: displaying, in a first area of a user interface for a game, a plurality of visual objects respectively indicating a plurality of items that are capable of enhancing in the game, via the display; in response to receiving first user inputs for selecting first visual objects from among the plurality of visual objects, displaying, in a second area of the user interface next to the first area, the first visual objects, via the display; while displaying, with the first visual objects, at least one second visual object indicating at least one resource for enhancement of items indicated by the first visual objects in the second area, receiving a second user input for executing the enhancement of the items; in response to receiving the second user input, displaying at least one visual effect for representing that the enhancement of the items is being executed; and based at least in part on completion of execution of the enhancement, displaying a result of the enhancement in the second area via the display after displaying the at least one visual effect.

BRIEF DESCRIPTION OF THE DRAWINGS

For a more complete understanding of the disclosure and its advantages, reference is now made to the following description, taken in conjunction with the accompanying drawings, in which.

DETAILED DESCRIPTION

Figure 1:
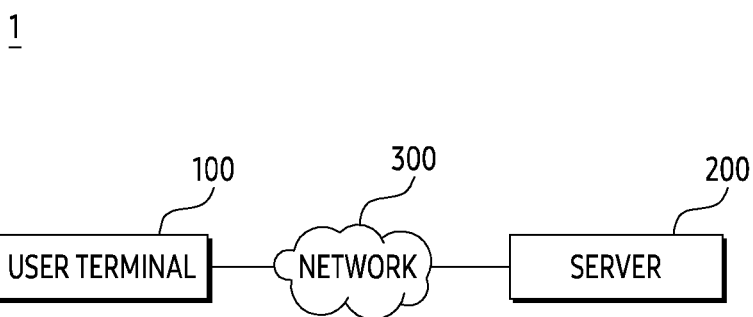
FIG. 1 is a block diagram illustrating a system for providing an item enhancement service in game according to an embodiment.

Hereinafter, example embodiments will be described with reference to the drawings. The following detailed description is made to provide a comprehensive understanding of the methods, apparatus, and/or systems described herein. However, it is only an example and the disclosed embodiments are not limited thereto.

In describing various embodiments, in case where it is determined that detailed descriptions of related known arts may unnecessarily obscure the subject matter of the disclosed embodiments, the detailed descriptions thereof will be omitted. Further, the terms to be described below are defined in consideration of functions in the disclosed embodiments, which may vary according to the intentions or practices of users and operators. Therefore, the definition should be made based on the contents throughout this specification. The terminology used in the detailed description is only for the purpose of describing the embodiments, and should in no way be construed to limit the same. Unless explicitly used otherwise, any expressions in the singular may include the meaning of the plural. In this description, expressions such as "have", "comprise", "include" or the like are intended to indicate certain features, numbers, steps, operations, elements, or a part or a combination thereof, and should not be construed to exclude the presence or possibility of one or more of features, numbers, steps, operations, elements, or a part or a combination thereof other than those described.

Hereinafter, the term "game" may mean a software that one or more gainers can enjoy using an input device mounted on or connected to a gaming device. It is usually carried out by directly manipulating a player character or by manipulating the movement of objects in the game, and its classification is often made on genres such as e.g., role-playing, adventure, and arcade.

Hereinafter, the term "gaming device" may refer to a hardware for executing a game software to perform calculations according to a user's input through an input device and output its result through an output device. For example, it may be in the form of a personal computer (PC), a laptop computer, a game console, a smartphone, a tablet PC, or a wearable device such as, e.g., a smart band or a smart watch, although it is not limited thereto. In addition, any hardware that satisfies the above definition may be construed as belonging to such a gaming device.

Hereinafter, the term "online game" may refer to a game that has to go through a network in order to play the game. In general, it may refer to a game in which two or more gaming devices in a remote location are connected to each other through a network or synchronized through a server. As long as it satisfies the above definition, there is no limitation on the type of the gaming device that executes such an online game. Not only the games executed on a personal computer or a game console, but also the games executed on a mobile device such as e.g., a smartphone, or any other games in which a multiplicity of different gaming devices (including different types of gaming devices) are linked together or executed in the cloud, are all construed as belonging to the online game, if it satisfies the above definition.

Hereinafter, the term "input device" may refers to a device for inputting data into a gaming device. For example, it may include any type of input device dedicated to the gaming manipulation, which is manufactured in the form of a joystick, a mouse, a keyboard, a touch screen, a hardware button or steering wheel, a musical instrument, a gun, a glove, a footrest, or the like. In addition, an example of the input device may include a positioning means such as e.g., various sensors (such as a temperature sensor, an infrared sensor, a motion sensor, a gyro-sensor, an acceleration sensor, a gravity sensor, etc.) installed in or linked to the gaming device, a Global Positioning System (GPS), an Indoor Positioning System (IPS), or the like.

FIG. 1 is a block diagram illustrating a system 1 for providing an item enhancement service in game according to an embodiment.

As shown in FIG. 1, the system 1 for providing the item enhancement service in game according to an embodiment may include a user terminal 100, a server 200, and a network 300.

The user terminal 100 may refer to a gaming device that is in association with the server 200 through the network 300 to receive a game service provided by the server 200.

Specifically, the user terminal 100 may be provided with a game service by exchanging a request signal and a response signal with the server 200 via the network 300, using a game application installed in the user terminal 100.

For convenience of explanation, the user terminal 100 may be referred to as a client, serving as a subject that receives an enhancement request for an item in game from a user and provides an item enhancement service, according to an embodiment of the disclosure.

The server 200 may refer to a device that provides a game service to the user who manipulates or operates the user terminal 100 to receive the request signal from the user terminal 100 via the network 300 and transmit the response signal thereto.

Specifically, the game service provided by the server 200 may be of a service for playing an online game, and the server 200 may transmit and receive signals to and from the plurality of user terminals 100 respectively, in particular, when providing a gaming service for e.g., a Massively Multiplayer Online Role-Playing Game (MMORPG).

According to an embodiment, the server 200 may serve as a subject that receives an enhancement request signal for an item in game from the user terminal 100 and provides the enhancement service to a game user who operates the user terminal 100.

The network 300 may include the Internet, one or more local area networks, wire area networks, cellular networks, mobile networks, other types of networks, or a combination of these networks.

Figure 2:
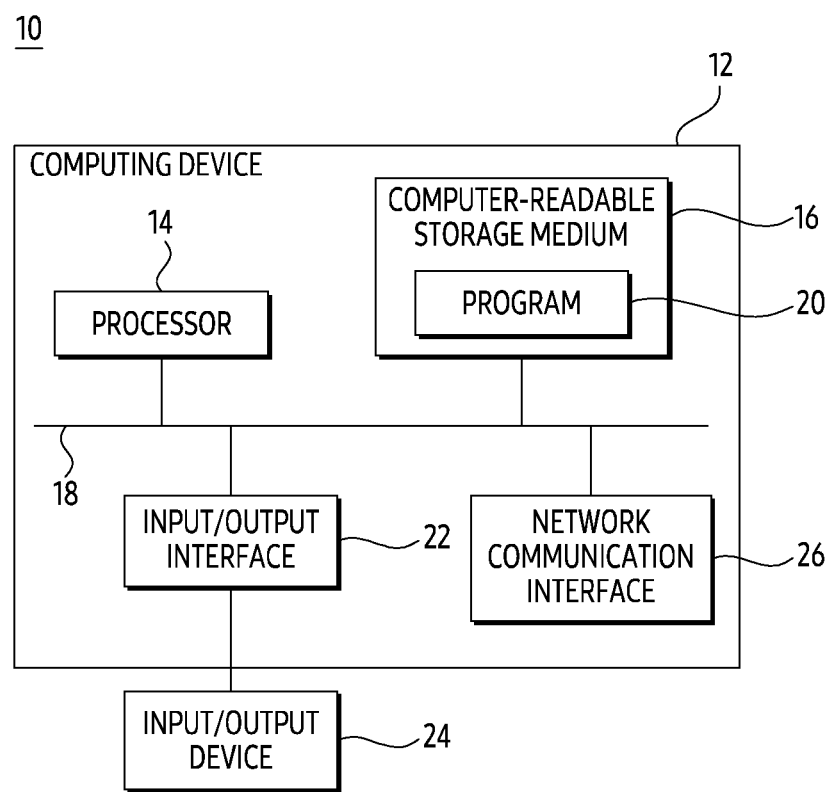
FIG. 2 is a block diagram illustrating an example of a computing environment including a computing device according to an embodiment.

FIG. 2 is a block diagram illustrating an example of a computing environment 10 including a computing device according to an embodiment. In the illustrated embodiment, each component may have different functions and capabilities other than those described below, and may further include any other elements in addition to those described below.

The computing environment 10 may include a computing device 12. In an embodiment, the computing device 12 may be the user terminal 100. Further, the computing device 12 may be the server 200 according to an embodiment.

The computing device 12 may include at least one processor 14, a computer-readable storage medium 16, and a communication bus 18. The processor 14 may cause the computing device 12 to operate in accordance with example embodiments discussed above. For example, the processor 14 may execute one or more programs stored in the computer-readable storage medium 16. The one or more programs may include one or more computer-executable instructions that may be configured, when executed by the processor 14, to cause the computing device 12 to perform operations according to the example embodiment.

The computer-readable storage medium 16 may be configured to store computer-executable instructions, program codes, program data, and/or other suitable form of information. At least one program 20 stored in the computer-readable storage medium 16 may include a set of instructions that are executable by the processor 14. In one embodiment, the computer-readable storage medium 16 may include at least one memory (e.g., a volatile memory such as a random access memory, a non-volatile memory, or a suitable combination thereof), one or more magnetic disk storage devices, optical disk storage devices, flash memory devices, other types of storage medium that may be accessed by the computing device 12 and store information as desired, or a suitable combination thereof.

The communication bus 18 may interconnect various other components in the computing device 12 inclusive of the processor 14 and the computer-readable storage medium 16.

The computing device 12 may further include one or more input/output interfaces 22 providing interfaces for one or more input/output devices 24, and one or more network communication interfaces 26. The input/output interface 22 and the network communication interface 26 may be coupled to the communication bus 18. The input/output device 24 may be coupled to other elements of the computing device 12 via the input/output interface 22. An example of the input/output device 24 may include input devices such as a pointing device (such as e.g., a mouse or a trackpad), a keyboard, a touch input device (such as e.g., a touchpad or a touchscreen), a voice or sound input device, various types of sensor devices, and/or an imaging device, and/or output devices such as e.g., a display device, a printer, a speaker and/or a network card. In an example embodiment, the input/output device 24 may be incorporated into the computing device 12 as one component composing the computing device 12, or may be connected to the computing device 12 as a separate device distinct from the computing device 12.

Figure 3:
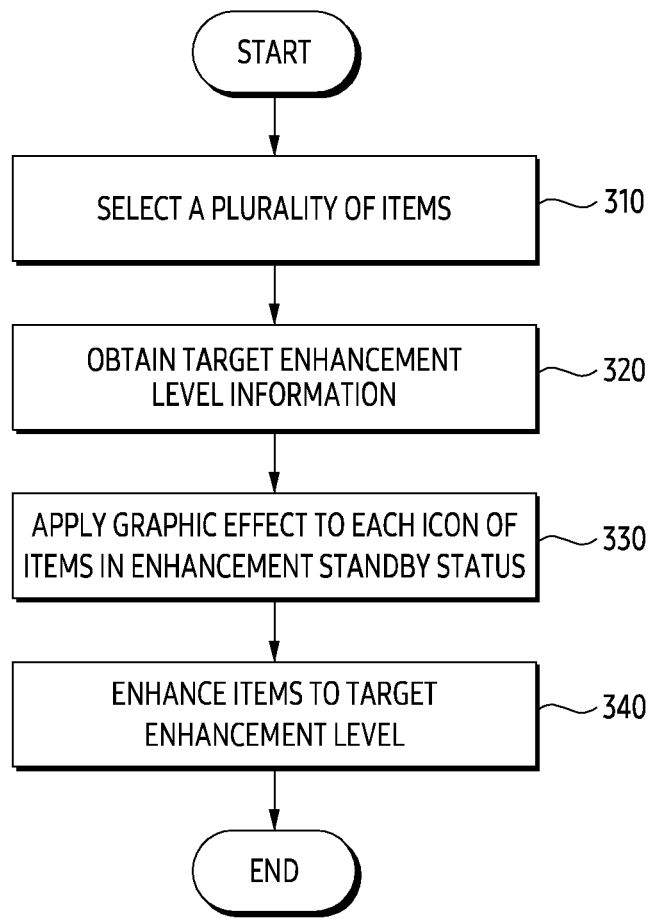
FIG. 3 is a flowchart illustrating a method of providing an item enhancement service in game according to an embodiment.

FIG. 3 is a flowchart illustrating a method of providing an item enhancement service in game according to an example embodiment.

The method illustrated in FIG. 3 may be performed by, for example, the user terminal 100 or the server 200 described above.

In operation 310, the user terminal 100 or the server 200 may receive a selection of a plurality of items from the user.

According to an embodiment, the user terminal 100 or the server 200 may receive a selection of an item dragged and dropped by a user into an empty slot located in a user interface (UI) window, but it is not limited to such a drag-and-drop manner. For example, it may also receive a selection of an item clicked or touched by the user in a separate UI window.

Thereafter, in operation 320, the user terminal 100 or the server 200 may obtain target enhancement level information from the user.

In the following embodiments, the term "target enhancement level" may refer to a level to which the enhancement intends to perform.

According to an embodiment, the user terminal 100 or the server 200 may obtain, from the user through an interface located in the UI window, the target enhancement level information, wherein the interface may be implemented with various forms such as e.g., a bar, a radio button, an option list, a direct inputting or the like.

Then, in operation 330, the user terminal 100 or the server 200 may apply a graphic effect to each icon of a plurality of items, based on the target enhancement level information and the enhancement-related settings of each of the plurality of items, in an enhancement standby status.

Specifically, the term "enhancement standby status" may refer to a state in which the enhancement is not yet initiated for the item selected by the user. Meanwhile, it is to be noted that the term "enhancement-related setting(s)" may include a current enhancement level of each item, a safety enhancement section, the number of times of enhancements available, and/or the effect applied upon a success of the enhancement, as well as any other additional information.

More specifically, the term "safety enhancement section" may imply a section in which a safe enhancement for each item may be performed without the item being lost. For example, for an item having the safety enhancement section of level 5, there is a possibility that the item will be lost from the timing point when the enhancement from level 5 to level 6 is carried out.

Then, in operation 340, the user terminal 100 or the server 200 may enhance the plurality of items to the target enhancement level, based on the target enhancement level information and the enhancement-related settings of each of the plurality of items.

According to an embodiment, the user terminal 100 or the server 200 may, according to the user's enhancement request, simultaneously apply a pre-selected enhancement material item to the enhancement target item of which current enhancement level is less than the target enhancement level, among the plurality of items, thereby enhancing the enhancement target item.

In the following embodiments, the term "enhancement material item" may imply an item such as e.g., enhancement scrolls, enchant scrolls, reinforcement scrolls, order scrolls, jewelry, gem, and any other miscellaneous goods for use in the item enhancement in game, but it is not necessarily limited thereto. For example, in case where two of the same weapon items of level 1 are required to enhance a weapon item from level 2 to level 3, the corresponding weapon item of level 1 may be also treated as an enhancement material item.

Specifically, the user terminal 100 or the server 200 may simultaneously apply the pre-selected enhancement material item to all the enhancement target items waiting for the enhancement, whenever the enhancement is performed once. A further detailed description of this operation will be made later on with reference to FIGS. 13A to 13G.

According to an embodiment, the user terminal 100 or the server 200 may, according to the user's request for enhancement, sequentially apply the pre-selected enhancement material item to an enhancement target item of which current enhancement level is less than the target enhancement level among the plurality of items, for the current enhancement level of each enhancement target item, so as to enhance the enhancement target item.

For example, when the enhancement material items are applied in ascending order, the user terminal 100 or the server 200 may collectively apply the enhancement material item to the items of which current enhancement level is level 1 among the enhancement target items waiting for enhancement, upon performing a first round of enhancement, and then collectively apply the enhancement material item to the items of which current enhancement level is level 2, upon performing a second round of enhancement.

For example, when the target enhancement level is level 5 and the enhancement material items are applied in descending order, the user terminal 100 or the server 200 may collectively apply the enhancement material item to the items of which current enhancement level is level 4 among the enhancement target items waiting for enhancement, upon performing the first round of enhancement, and collectively apply the enhancement material item to the items of which current enhancement level is level 3, upon performing the second round of enhancement.

A more detailed description of this operation will be made later on with reference to FIGS. 14A to 14E.

According to an embodiment, the user terminal 100 or the server 200 may visually display a result according to the operation 340 in a UI window in which the graphic effect according to the operation 330 is displayed.

According to an embodiment, when the user terminal 100 or the server 200 performs an enhancement out of the safety enhancement section, the result according to the operation 340 may be visually displayed in a pop-up UI window separate from the UI window displaying the graphic effect according to the operation 330.

For example, when the user terminal 100 or the server 200 performs the enhancement for an item classified as the risk status, the result according to the operation 340 may be visually displayed through the entire screen popped up over the UI window displaying the graphic effect according to the operation 330. In this context, a more detailed description of this operation will be made later on with reference to FIG. 9.

According to an embodiment, in performing the operation 340, the user terminal 100 or the server 200 may, while the enhancement is in progress, add a temporary dynamic graphic effect indicating that enhancement is in progress, to the inside of each icon of the item for which enhancement is in progress, based on whether or not the enhancement is performed within the safety enhancement section.

Accordingly, the user may easily distinguish the item for which the enhancement is in progress from the plurality of items, and may intuitively determine whether the enhancement in progress is being performed within the safety enhancement section as well.

Further, according to an embodiment, when the user terminal 100 or the server 200 performs the enhancement out of the safety enhancement section in performing the operation 340, it is possible to add a temporary dynamic graphic effect indicating whether or not the enhancement is successful, into each icon of the item for which the enhancement has been performed.

Accordingly, the user may intuitively determine whether or not the enhancement is successful for the item for which the enhancement is performed out of the safety enhancement section, immediately following the enhancement.

The addition of the temporary dynamic graphic effect will be described later in more detail later with reference to FIG. 10.

Figure 4:
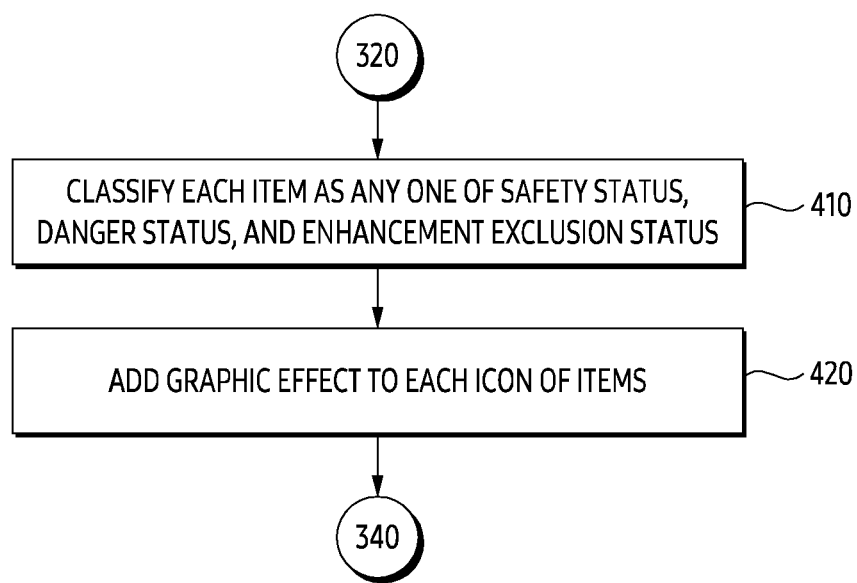
FIG. 4 is a flowchart illustrating operation 330 in FIG. 3 in more detail according to an embodiment.

FIG. 4 is a flowchart for explaining the operation 330 in more detail according to an embodiment.

The method shown in FIG. 4 may be performed by, for example, the user terminal 100 or the server 200 described above.

In operation 410, the user terminal 100 or the server 200 may classify each of a plurality of items as either one of the safety status, the risk status, and the enhancement exclusion status, based on the target enhancement level information obtained from the user and the enhancement-related settings of each of the plurality of items.

Then, in operation 420, the user terminal 100 or the server 200 may add a graphic effect to each icon of the plurality of items, based on a result of the classification in the operation 410.

Figure 5:
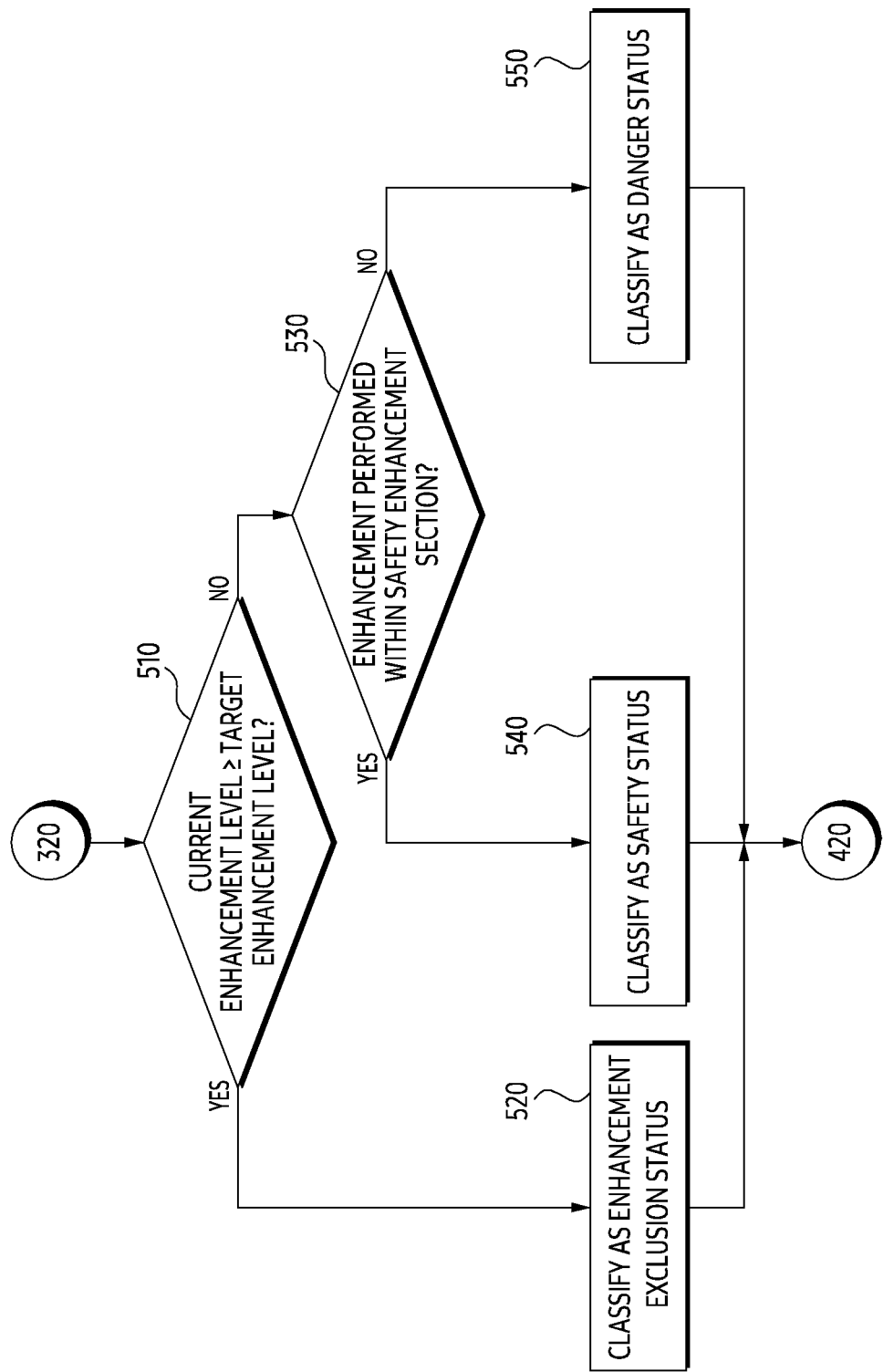
FIG. 5 is a flowchart illustrating operation 410 in FIG. 4 in more detail according to an embodiment.

FIG. 5 is a flowchart for describing the operation 410 in more detail according to an embodiment.

The method illustrated in FIG. 5 may be performed by, for example, the user terminal 100 or the server 200 described above.

In operation 510, the user terminal 100 or the server 200 may determine whether the current enhancement level of each of the plurality of items is equal to or higher than the target enhancement level.

Then, in operation 520, the user terminal 100 or the server 200 may classify an item of which current enhancement level is equal to or higher than the target enhancement level, as the enhancement exclusion status.

Meanwhile, in operation 530, when the user terminal 100 or the server 200 enhances an item of which current enhancement level is less than the target enhancement level, up to the target enhancement level, it may determine whether the enhancement is performed within the safety enhancement section.

Then, in operation 540, the user terminal 100 or the server 200 may, upon enhancing up to the target enhancement level, classify an item for which the enhancement is performed within the safety enhancement section, as the safety status.

Then, in operation 550, the user terminal 100 or the server 200 may, upon enhancing up to the target enhancement level, classify an item for which the enhancement is performed out of the safety enhancement section, as the risk status.

Figure 6:
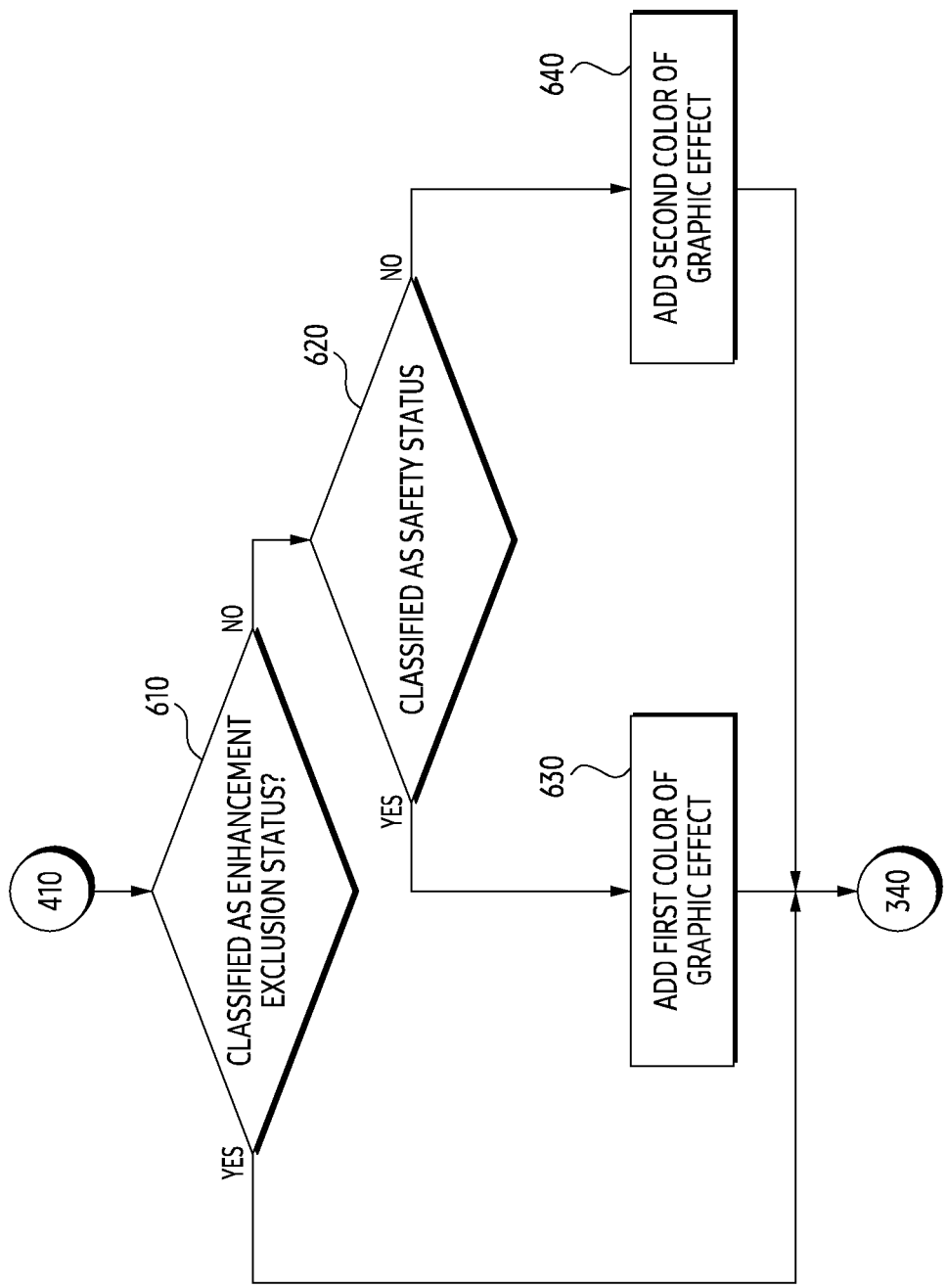
FIG. 6 is a flowchart illustrating operation 420 in FIG. 4 in more detail according to an embodiment.

FIG. 6 is a flowchart for describing the operation 420 in more detail according to an embodiment.

The method shown in FIG. 6 may be performed by, for example, the user terminal 100 or the server 200 described above.

In operation 610, the user terminal 100 or the server 200 may determine whether or not each of the plurality of items is classified as the enhancement exclusion status.

Then, the user terminal 100 or the server 200 may perform the operation 340 according to the user's request, without adding a separate graphic effect to an icon of the item classified as the enhanced exclusion state.

Meanwhile, in operation 620, the user terminal 100 or the server 200 may determine whether it is classified as the safety status for each item not classified as the enhancement exclusion status.

Then, in operation 630, the user terminal 100 or the server 200 may add a first color of graphic effect along an outline of the icon of the item classified as a safety status.

Then, in operation 640, the user terminal 100 or the server 200 may add a second color of graphic effect along an outline of the icon of the item classified as the risk status.

According to an embodiment, at least one of the first color of graphic effect and the second color of graphic effect may be rotated clockwise or counterclockwise along the outline of the icon of the item to which the graphic effect is applied.

Figure 7:
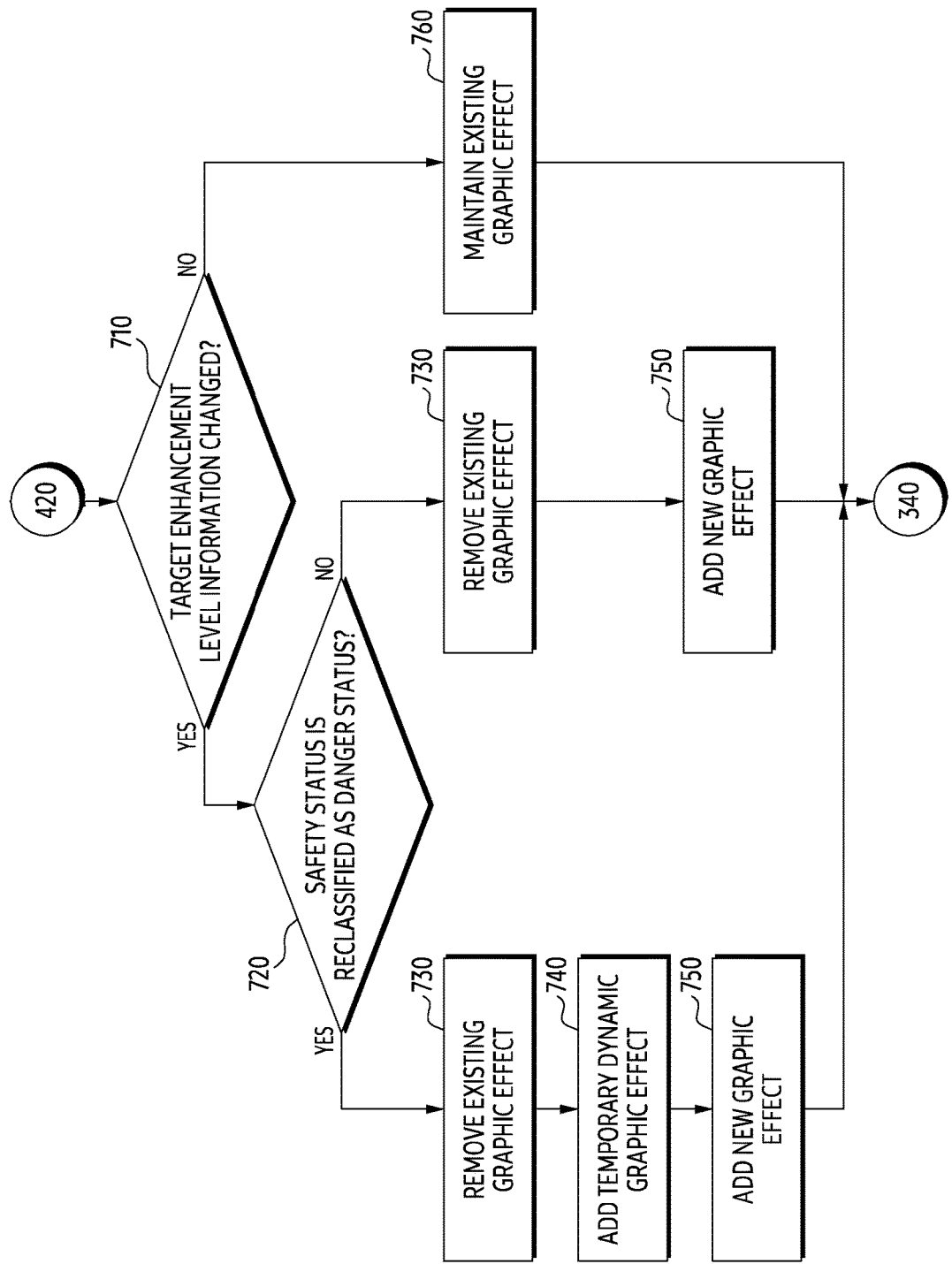
FIG. 7 is a flowchart illustrating operation 330 in FIG. 3 in more detail according to an embodiment.

FIG. 7 is a flowchart for explaining the operation 330 in more detail according to another embodiment.

The method shown in FIG. 7 may be performed by, for example, the user terminal 100 or the server 200 described above.

First, in operation 710, the user terminal 100 or the server 200 may determine whether the target enhancement level information has been changed in response to a request from a user.

Then, in operation 720, when it is determined that the target enhancement level information has been changed, the user terminal 100 or the server 200 may determine whether the item classified as the safety status is reclassified as the risk status as the target enhancement level information is changed.

Then, in operation 730, the user terminal 100 or the server 200 may remove the existing graphic effect corresponding to the safety status from the item reclassified from the safety status to the risk status.

Then, in operation 740, the user terminal 100 or the server 200 may add a temporary dynamic graphic effect indicating that the item is reclassified from the safety status to the risk status, to the item reclassified from the safety status to the risk status.

Then, in operation 750, the user terminal 100 or the server 200 may add a new graphic effect corresponding to the risk status, to the item reclassified from the safety status to the risk status.

Referring to FIG. 7, in operation 760, when it is determined that the target enhancement level information has not been changed, the user terminal 100 or the server 200 may maintain existing graphic effect has been applied in operation 710.

Although FIGS. 3 to 7 describe the method including multiple operations, at least some of the operations may be performed in a different order or in combination with other operations, omitted, or divided into more detailed operations, or added with one or more other operations not shown.

Figure 8A:
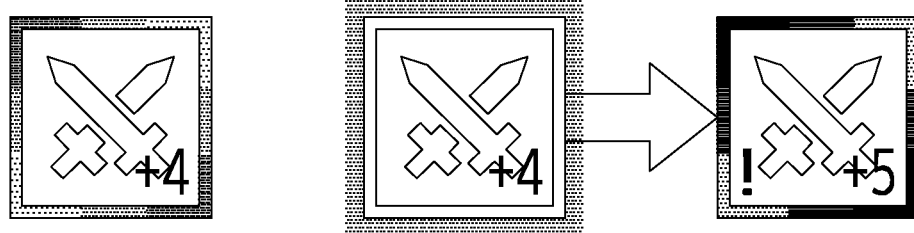
FIGS. 8A and 8B each show an example schematic diagram for explaining operations 730 to 750 in FIG. 7 in more detail according to embodiments.
Figure 8B:
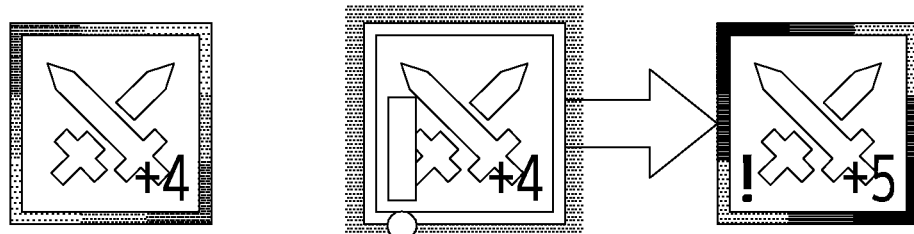

FIGS. 8A and 8B are example schematic diagrams for explaining the operations 730 to 750 in more detail according to an embodiment.

Referring to FIGS. 8A and 8B, level 0 to level 5 may correspond to the safety enhancement section, and from when performing the enhancement from level 5 to level 6 are shown the items set to deviate from the safety enhancement section.

Referring first to FIG. 8A, as the enhancement of the item illustrated is made from level 4 to level 5, the user terminal 100 or the server 200 may determine that the enhancement is to be performed out of the safety enhancement section in performing a future enhancement for the illustrated item, and classify the item as the risk status.

Accordingly, the illustrated item may be reclassified from the existing safety status to the risk status, and the user terminal 100 or the server 200 may then perform the operation 730 to get rid of a blue colored outline added to a periphery of the icon of the illustrated item.

Then, the user terminal 100 or the server 200 may perform the operation 740 to add a temporary dynamic graphic effect in which a red colored outline gradually gets thicker in the periphery of the icon of the illustrated item.

Then, the user terminal 100 or the server 200 may perform the operation 750 to add a red outline to the periphery of the icon of the illustrated item, and add a red exclamation mark to the inner leftmost bottom side thereof.

However, when it is determined that adding the graphic effect in this way is not sufficient to attract the user's attention, additional graphic effects may be added.

In this context, referring to FIG. 8B, the user terminal 100 or the server 200, in performing the operation 740 may add a dynamic graphic effect that the exclamation mark gradually shrinks after it has popped up in the inner leftmost bottom side of the icon, in addition to applying a dynamic graphic effect that the outline of the icon of the item gradually gets thicker.

However, the graphic effect added by the user terminal 100 or the server 200 is not limited thereto, and it is to be noted that various types of graphic effects may be added to draw the user's attention in consideration of the visibility of contents in game.

Figure 9A:
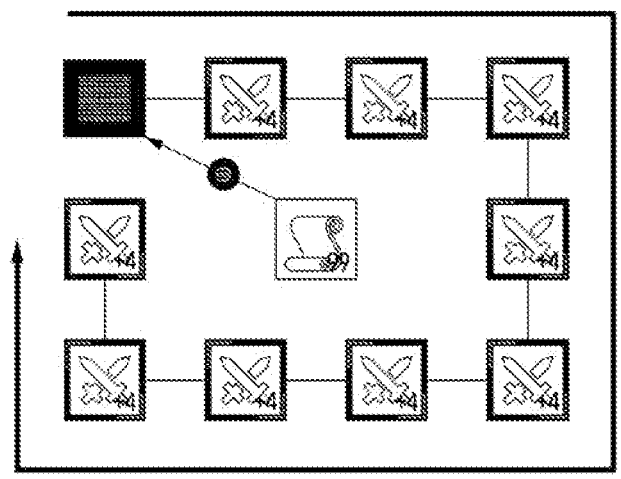
FIGS. 9A and 9B each show an example schematic diagram illustrating a separate pop-up screen for implementation of operation 340 in FIG. 3 according to embodiments.
Figure 9B:
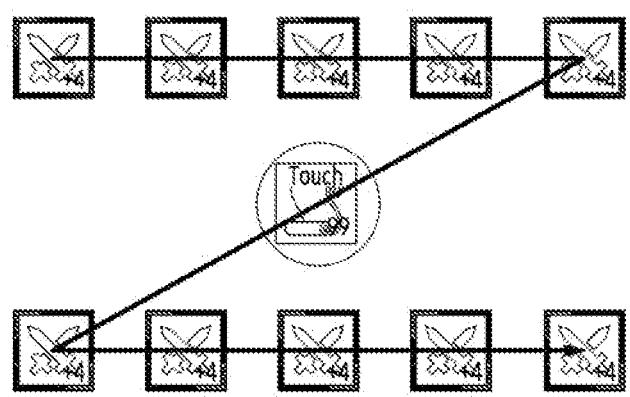

FIGS. 9A and 9B are example schematic diagrams illustrating a screen that is separately popped up to implement the operation 340 according to example embodiments.

Referring to FIGS. 9A and 9B, when the enhancement of the item classified as the risk status is performed, it is shown a screen newly popped up to perform the operation 340. This is to draw the user's attention because there is more possibility of item losing when enhancing the item classified as the risk status, compared to when enhancing the item classified as the safety status. Therefore, it is apparent that various graphic effects may be utilized to implement the operation 340 on a new screen.

Referring again to FIG. 9A, for one example of such scenarios, from when a graphic object starting from an icon of an enhancement material item located in the center of the screen touches an icon of a certain item, the icon touched by the graphic object begins to shine and perform the enhancement. Then, the enhancements of respective items are sequentially performed in the direction of the arrow shown in the figure.

Meanwhile, referring to FIG. 9B for another example, when the user touches the icon of the enhancement material item located in the center of the screen, the enhancements of the respective items are sequentially carried out in the direction of the arrow shown, taking the item at a predetermined position as a starting point.

For the above two examples, since the enhancements of the respective items are carried out with a certain time difference, the user may be enabled to identify a result of the enhancement from the item for which the enhancement has been performed first, so as to make the user more immersed in the enhancement-related contents.

However, the graphic effect added by the user terminal 100 or the server 200 is not limited thereto, and it is to be noted that various types of graphic effects may be further added to draw the user's attention more, in consideration of the visibility of the contents in the game.

Figure 10:
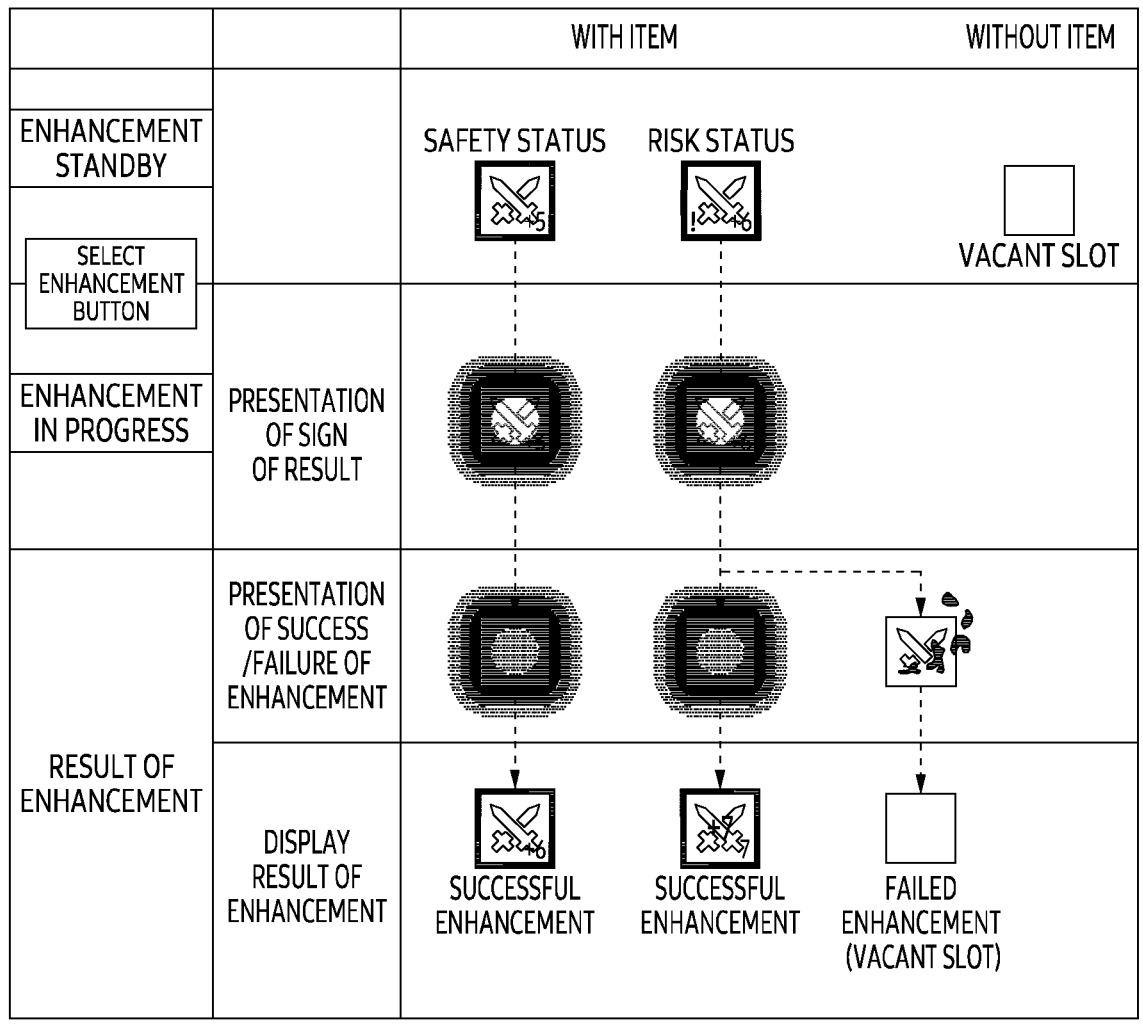
FIG. 10 is an example schematic diagram for explaining a temporary dynamic graphic effect according to an embodiment.

FIG. 10 is an example diagram for explaining a temporary dynamic graphic effect according to an embodiment.

Referring now to FIG. 10, for example, when the enhancement is performed according to the user's request, the user terminal 100 or the server 200 may add a temporary dynamic graphic effect that a blue light source is caused to brighten and spread out from the center of the icon of the item for which the enhancement within the safety enhancement section (hereinafter, referred to as "safety enhancement") is performed.

On the other hand, for example, when the enhancement is performed according to the user's request for enhancement, the user terminal (100 or server 200 may add another temporary dynamic graphic effect that a yellow light source is caused to brighten and spread out from the center of the icon of the item for which the enhancement out of the safety enhancement section (hereinafter, referred to as "risk enhancement") is performed.

Then, for example, when the risk enhancement of the item is successful, the user terminal 100 or server 200 may add a temporary dynamic graphic effect that the yellow light source spreading out from the center of the icon of the item, immediately before a result of the successful enhancement is displayed, becomes brighter and wavers.

On the other hand, for example, when the risk enhancement of the item fails, the user terminal 100 or server 200 may add a temporary graphic effect that the icon of the item gradually disappears and smoke comes out, immediately before the item gets lost as a result of the failed enhancement.

However, the graphic effect added by the user terminal 100 or the server 200 is not limited thereto, and it should be noted that various types of graphic effects may be further added to draw the user's attention more, in consideration of the visibility of the contents in the game.

Figure 11:
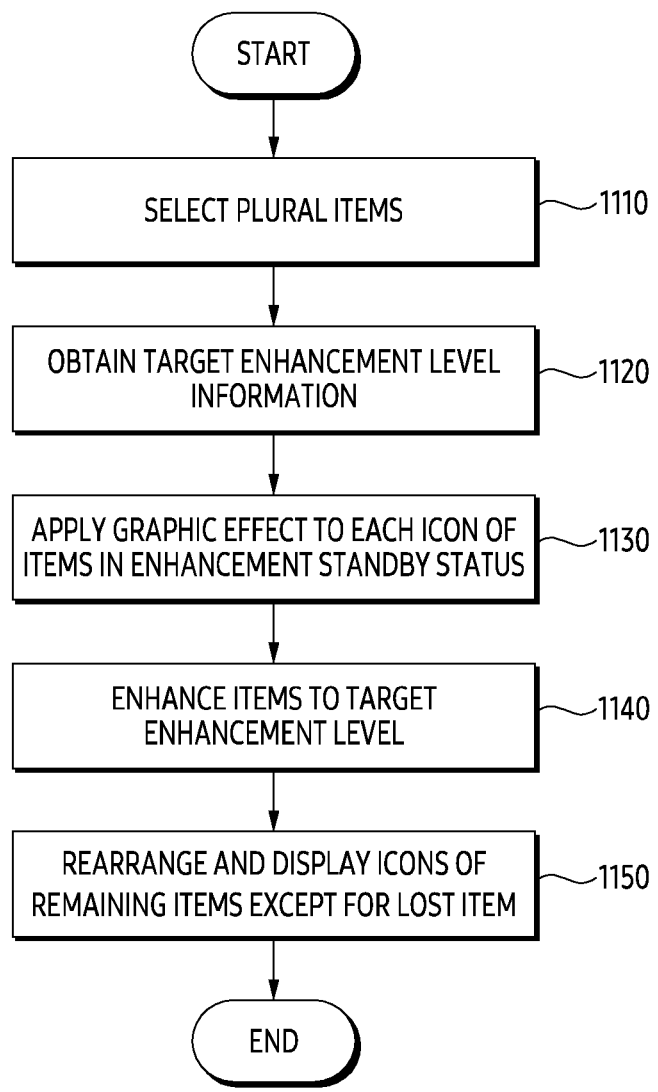
FIG. 11 is a flowchart illustrating a method of providing an item enhancement service in game according to an embodiment.

FIG. 11 is a flowchart for explaining a method of providing an item enhancement service in game according to another embodiment.

The method shown in FIG. 11 may be performed by, for example, the user terminal 100 or the server 20 described above.

First, in operation 1110, the user terminal 100 or the server 200 may receive a selection of a plurality of items from the user.

Then, in operation 1120, the user terminal 100 or the server 200 may obtain target enhancement level information from the user.

Then, in operation 1130, the user terminal 100 or the server 200 may apply a graphic effect to each icon of the plurality of items, based on target enhancement level information and enhancement-related settings of each of the plurality of items, in an enhancement standby status.

Then, in operation 1140, the user terminal 100 or the server 200 may enhance the plurality of items to the target enhancement level, based on the target enhancement level information and the enhancement-related settings of each of the plurality of items.

Thereafter, in operation 1150, the user terminal 100 or the server 200 may rearrange and display the icons of the remaining items except for the lost item among the plurality of items, based on whether or not each of the plurality of items is successful and predetermined arrangement criteria.

According to an embodiment, the user terminal 100 or the server 200 may rearrange the item classified as the risk status among the items of the successful enhancement, so that the items are displayed in the UI window in preceding order, compared to the item classified as the safety status.

According to an embodiment, the user terminal 100 or the server 200 may rearrange the items having a current enhancement level equal to or higher than the target enhancement level among the items of the successful enhancement, so that the items are displayed in the UI window in the order of the higher current enhancement level first.

Although FIG. 11 illustrates that the method is divided into a plurality of operations, at least some of the operations may be performed in a different order or in combination with other operations, or may be omitted, divided into more detailed operations, or added with one or more other operations not shown herein.

Figure 12:
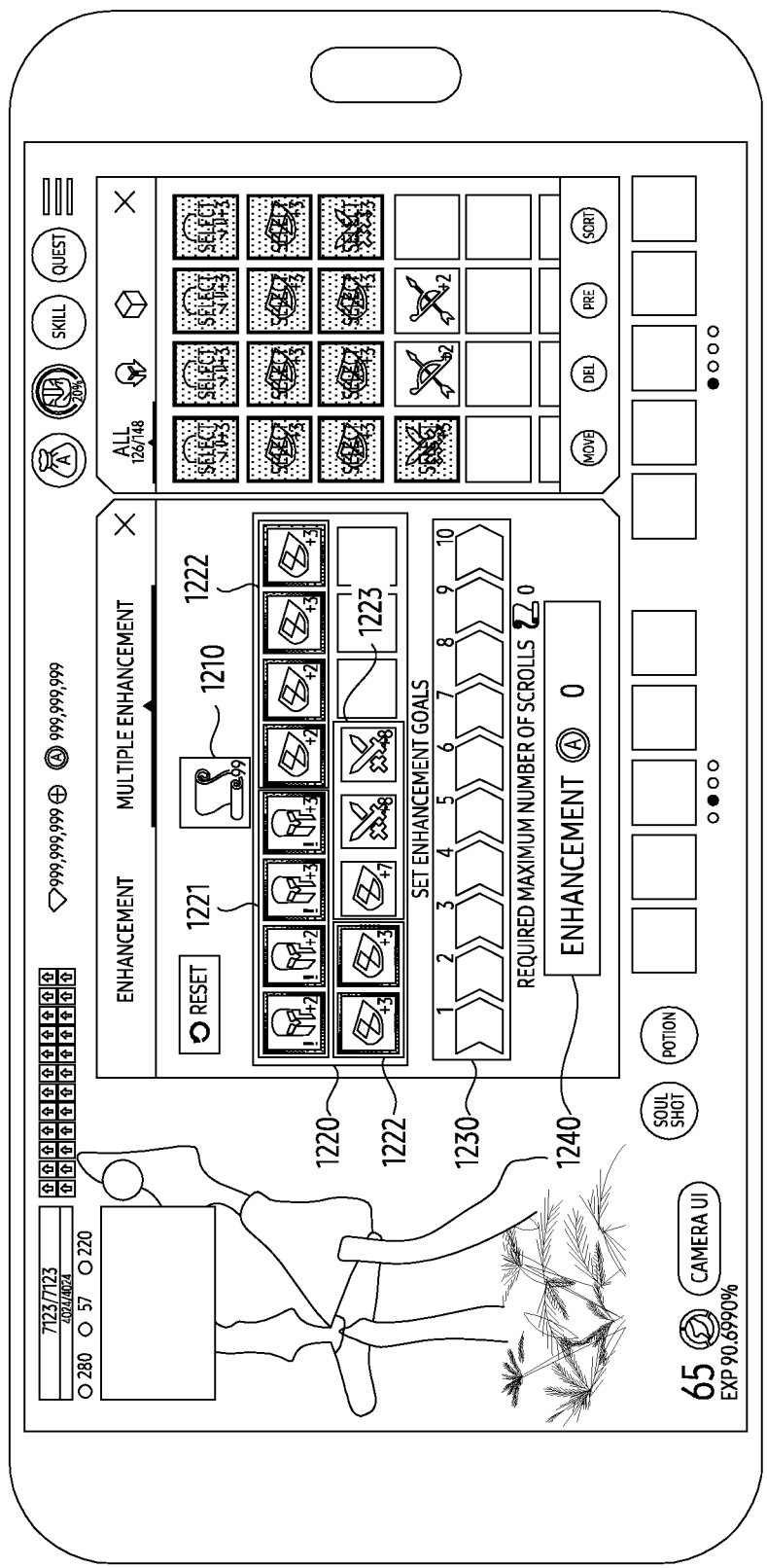
FIG. 12 is an example view illustrating a screen on which an item enhancement service in game is provided according to an embodiment.

FIG. 12 is an example view illustrating a screen in which an item enhancement service in game is provided according to an embodiment.

As illustrated, the screen may display an enhancement material item slot 1210, a plurality of item slots 1220 for enhancement, a target enhancement level setting interface 1230, and an enhancement button 1240.

Referring to FIG. 12, for example, a total of 99 orders are inserted into the enhancement material item slot 1210, and head accessory items of level 2, level 2, level 3 and level 3 classified as the risk status are inserted in sequence into slots 1 to 4 (1221) of a plurality of item slots 1220.

Further, shield items of level 2, level 2, level 3, level 3, level 3, level 3 classified as the safety status are inserted in sequence into slots 5 to 10 (1222) of the plurality of item slots 1220, and a shield item of level 7, an weapon item of level 8 and the weapon item of level 8 classified as the enhancement exclusion status are inserted in sequence into slots 11 to 13 (1223) of the plurality of item slots 1220.

Specifically, a red colored outline is added to the periphery of the icons of the items classified as the risk status, inserted into the slots 1 to 4 (1221), and a red colored exclamation mark is added to the inner leftmost bottom thereof. Furthermore, a blue colored outline is added to the periphery of the icons of the items classified as the safety status, inserted into the slots 5 to 10 (1222).

When the user sets the target enhancement level using the target enhancement level setting interface 1230, and presses the enhancement button 1240, the user terminal 100 or the server 200 may provide the enhancement service for the items inserted to the slots 1 to 13 (1221, 1222 and 1223) according to the set target enhancement level.

Hereinafter, FIGS. 13A to 13G and 14A to 14E will be described in detail, based on the above description with reference to FIG. 12.

FIGS. 13A to 13G each are example views illustrating a screen on which an item enhancement in game is performed according to example embodiments.

Figure 13A:
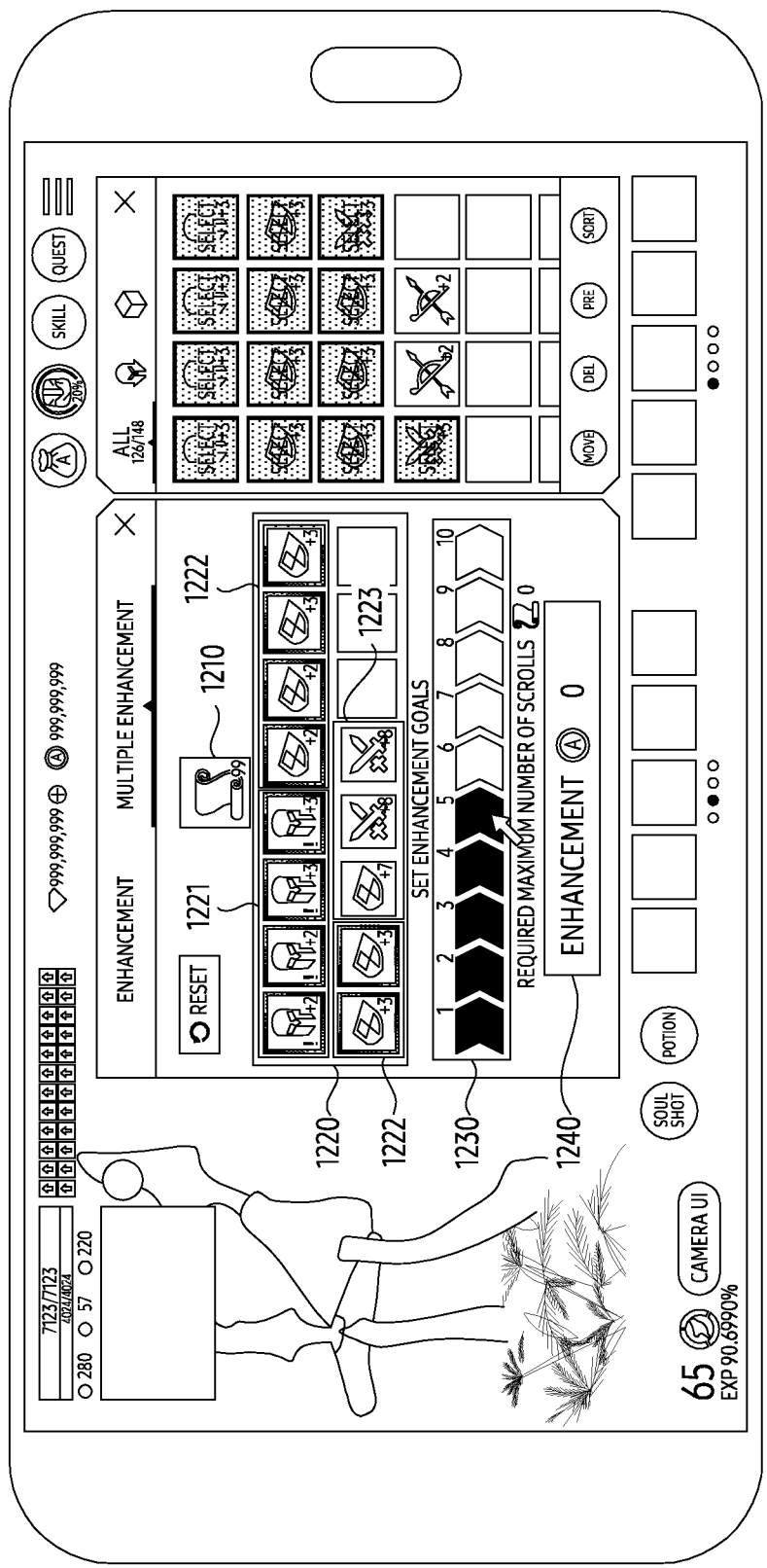
FIGS. 13A to 13G are example views illustrating a screen on which an item enhancement in game is performed according to embodiments.

As illustrated in FIG. 13A, the user may set the target enhancement level to level 5, using the target enhancement level setting interface 1230.

Figure 13B:
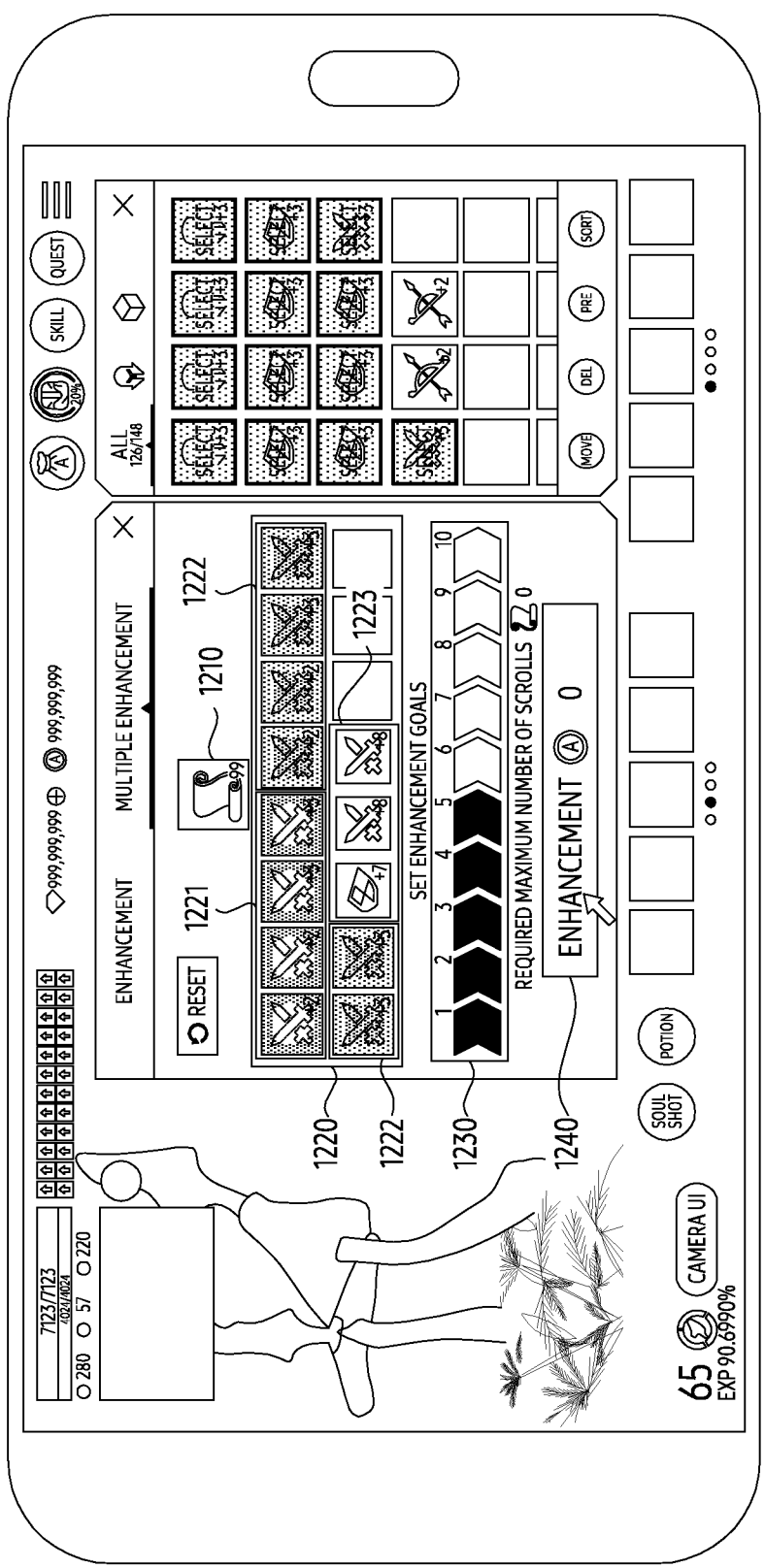

Then, as illustrated in FIG. 13B, when the user presses the enhancement button 1240, a graphic effect of a yellow light source, indicating that enhancement is in progress, may be added to the inside of the icons of the items inserted in the slots 1 to 4 (1221), and another graphic effect of a blue light source, indicating that enhancement is in progress, may be added to the inside of the icons of the items inserted in the slots 5 to 10 (1222). On the other hand, the items inserted to the slots 11 to 13 (1223) may be classified as the enhancement exclusion status, with no enhancement being performed.

At this time, the enhancement is performed for a total of 10 items in the first enhancement, so the quantity of the orders inserted into the enhancement material item slot 1210 is subtracted by 10.

Figure 13C:
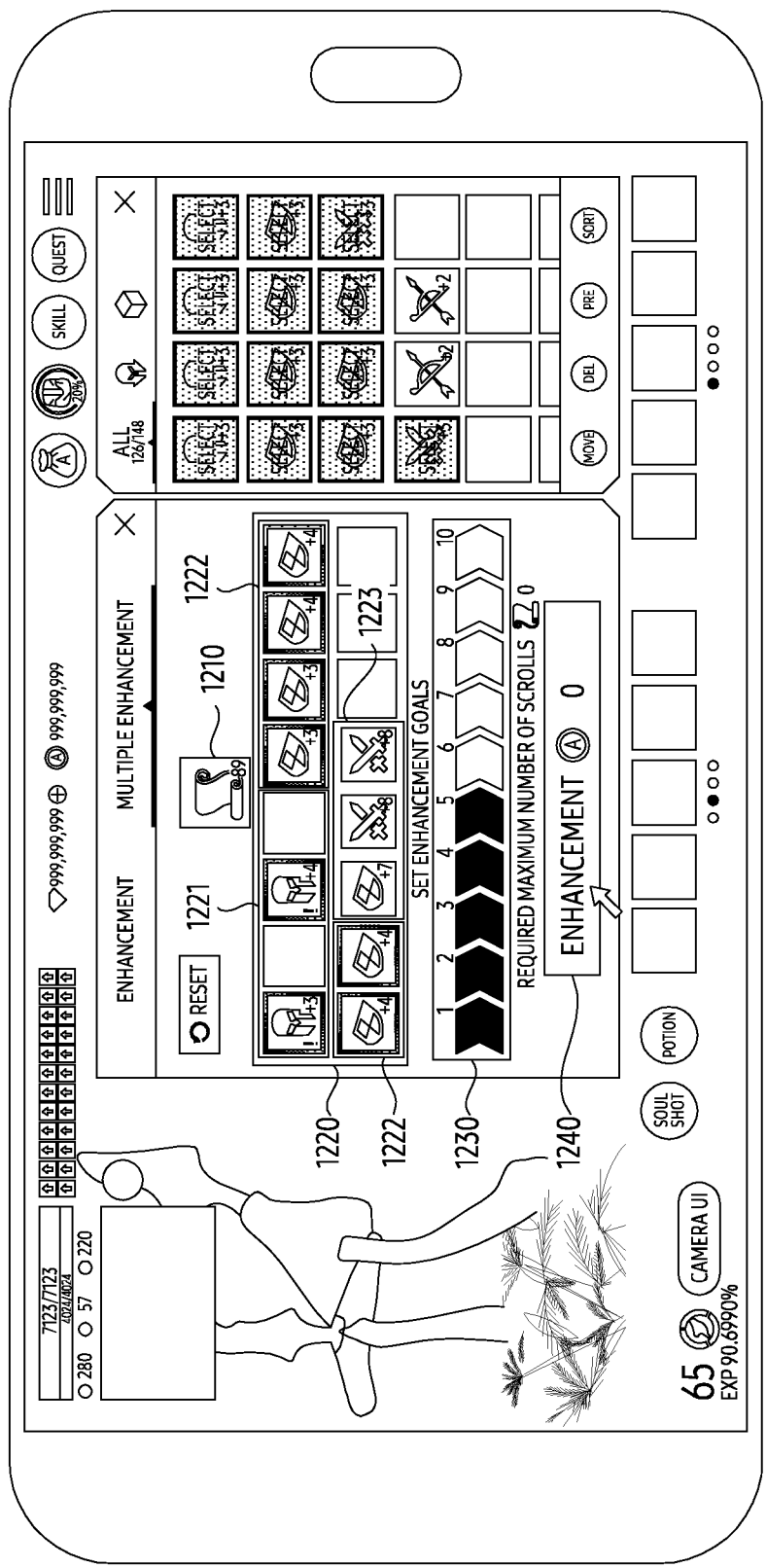

Then, as illustrated in FIG. 13C, as a result of performing the first round of enhancement, it reveals that the items inserted to the slot 2 and the slot 4 failed in the enhancement and got lost, and the enhancement level of the items inserted to the slot 1, the slot 3 and the slots 5 to 10 (1222) increased by 1.

Figure 13D:
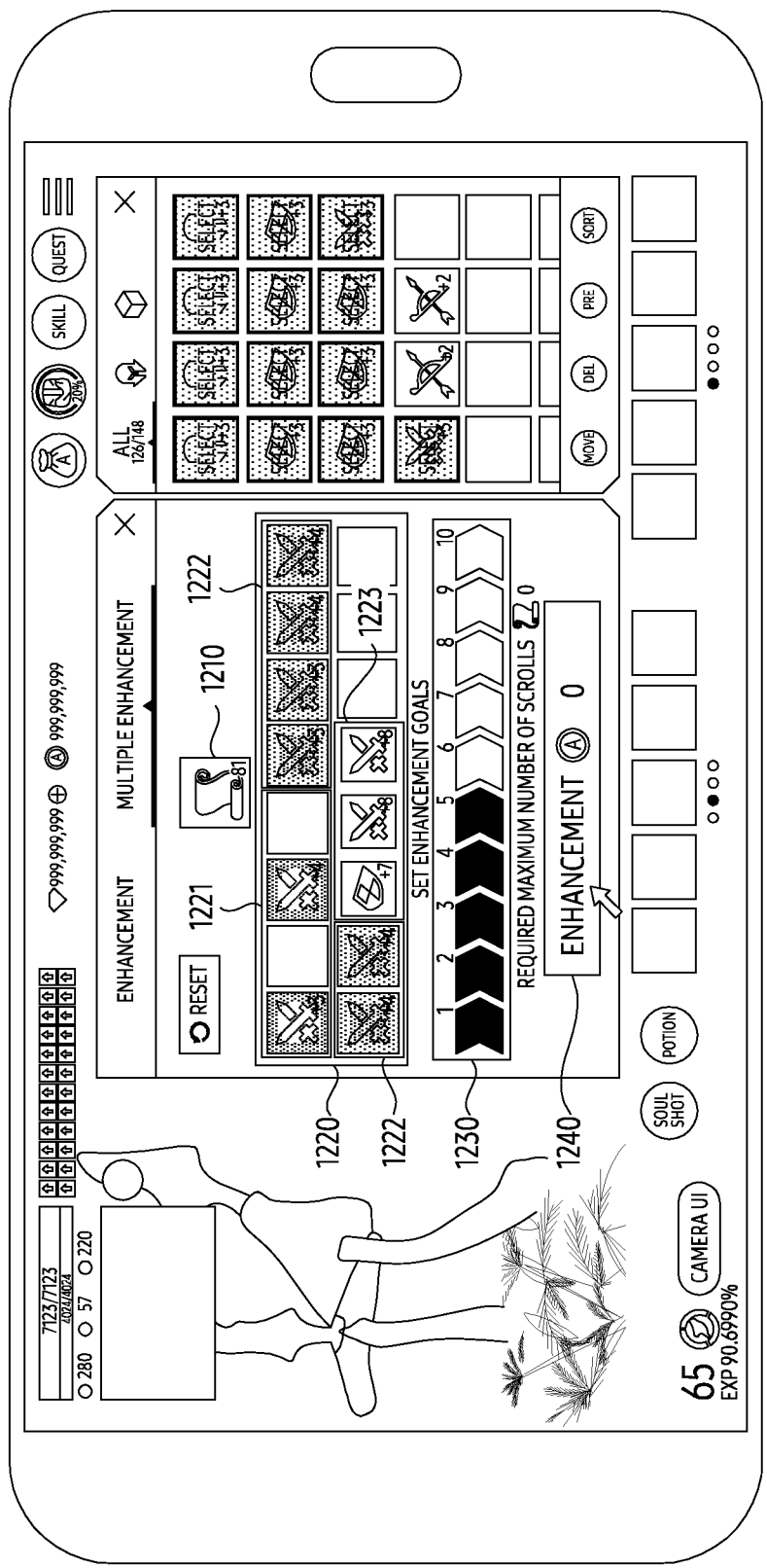

Then, as illustrated in FIG. 13D, once the second round of enhancement is performed, the enhancements are performed for each of the items inserted into the slot 1, the slot 3, and the slots 5 to 10 (1222) of which current enhancement level is below the level 5.

Specifically, the graphic effect of a yellow light source indicating that the enhancement is in progress may be added to the inside of the icons of the items inserted in the slots 1 and 3, and the graphic effect of a blue light source indicating that the enhancement is in progress may be added to the inside of the icons of the items inserted in the slots 5 to 10 (1222).

At this juncture, the enhancement is performed for a total of 8 items in the second round of enhancement, so the quantity of the orders inserted into the enhancement material item slot 1210 is further subtracted by 8.

Figure 13E:
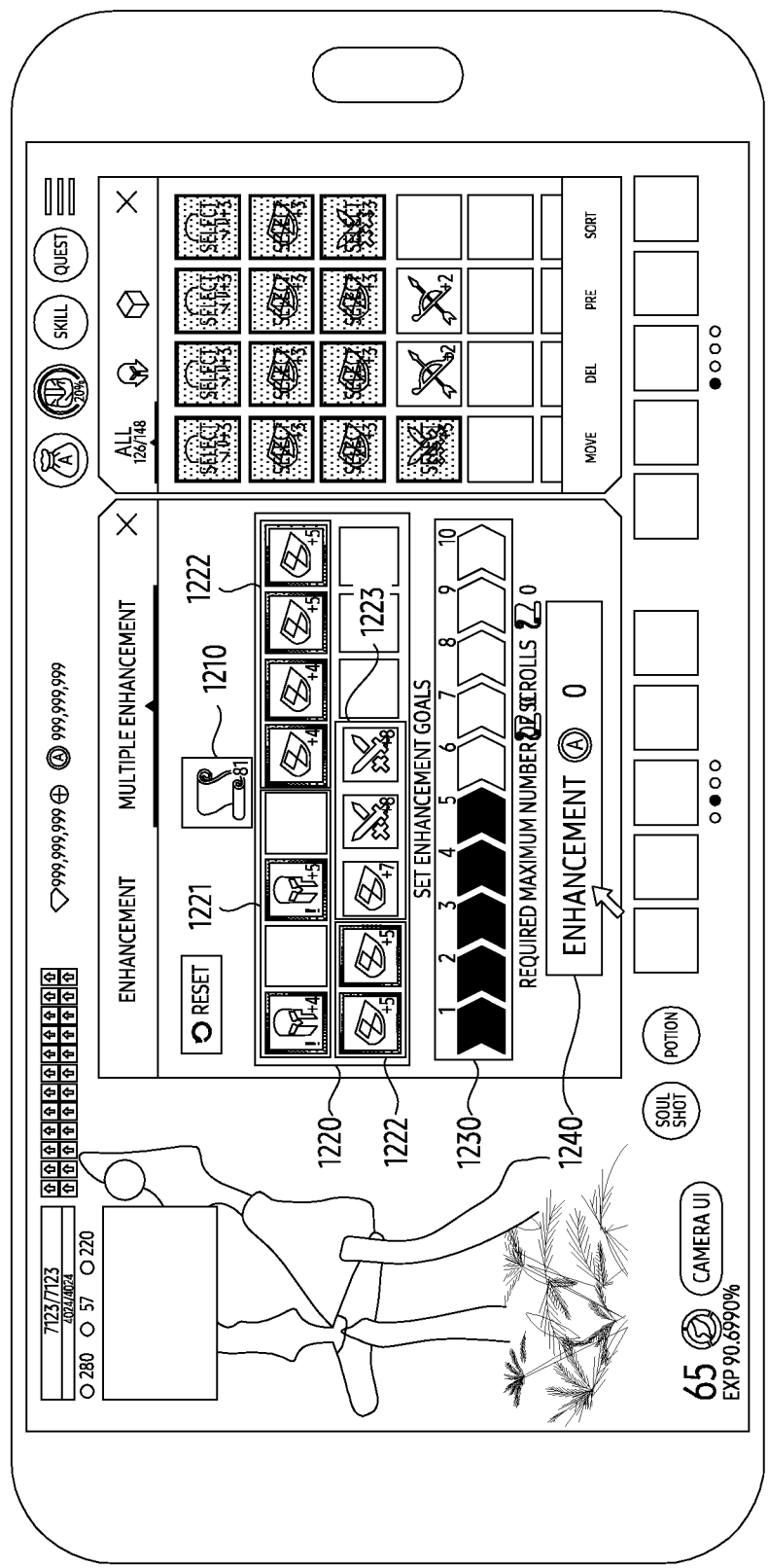

Next, as illustrated in FIG. 13E, as a result of performing the second round of enhancement, it reveals that the items inserted in the slot 1, the slot 3, and the slots 5 to 10 (1222) succeeded in enhancement and their enhancement level increased by 1.

Figure 13F:
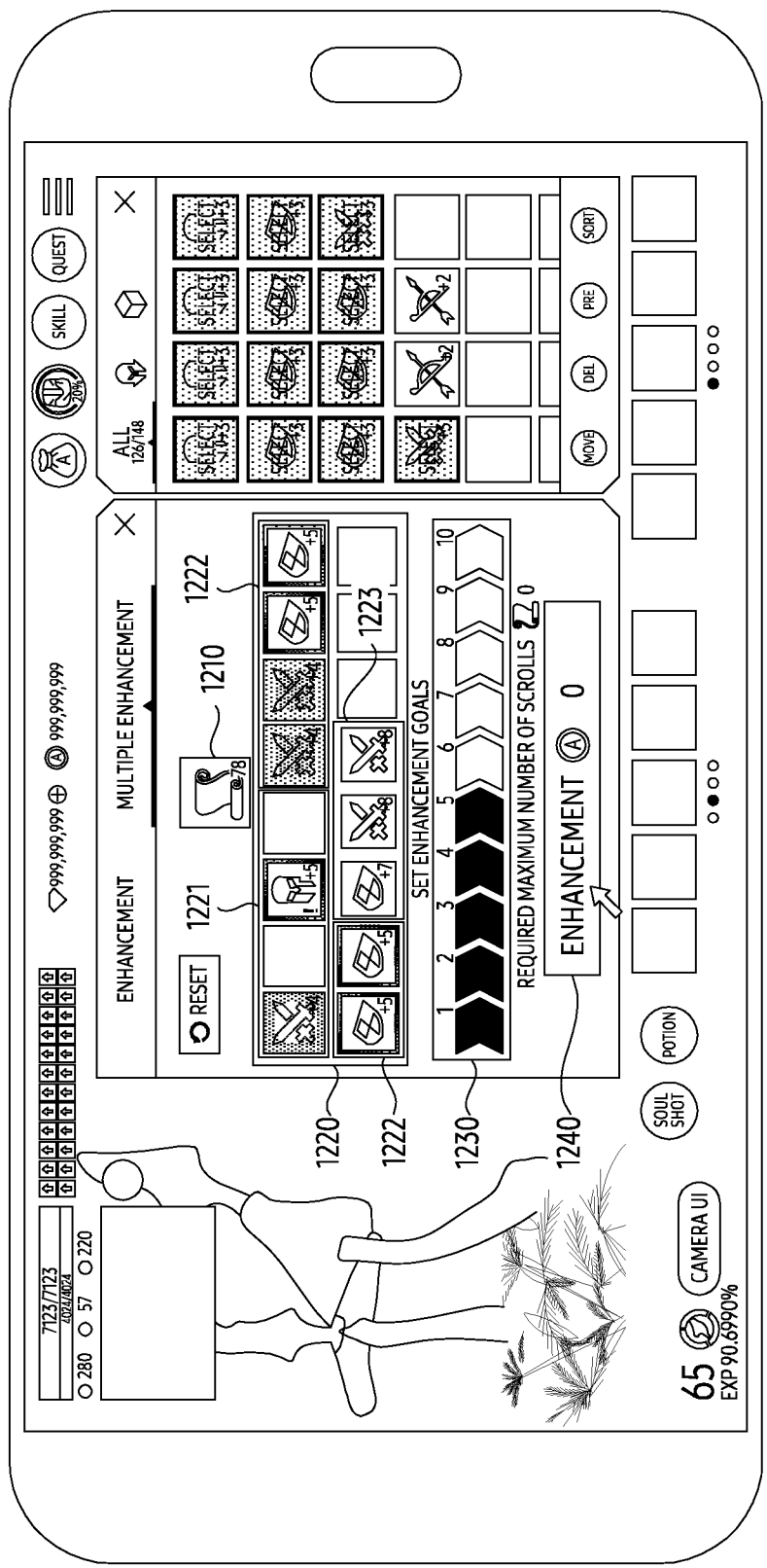

Then, as illustrated in FIG. 13F, once a third round of enhancement is performed, the enhancement is performed for each of the items inserted into the slots 1, 5, and 6, of which enhancement level is below the level 5.

Specifically, the graphic effect of a yellow light source indicating that the enhancement is in progress may be added to the inside of the icon of the item inserted in the slot 1, and the graphic effect of a blue light source indicating that the enhancement is in progress may be added to the inside the icon of the item inserted in the slot 5 and the slot 6.

At this time, since the enhancement is performed for a total of three items in the third round of enhancement, the quantity of the orders inserted into the enhancement material item slot 1210 is further subtracted by 3.

Figure 13G:
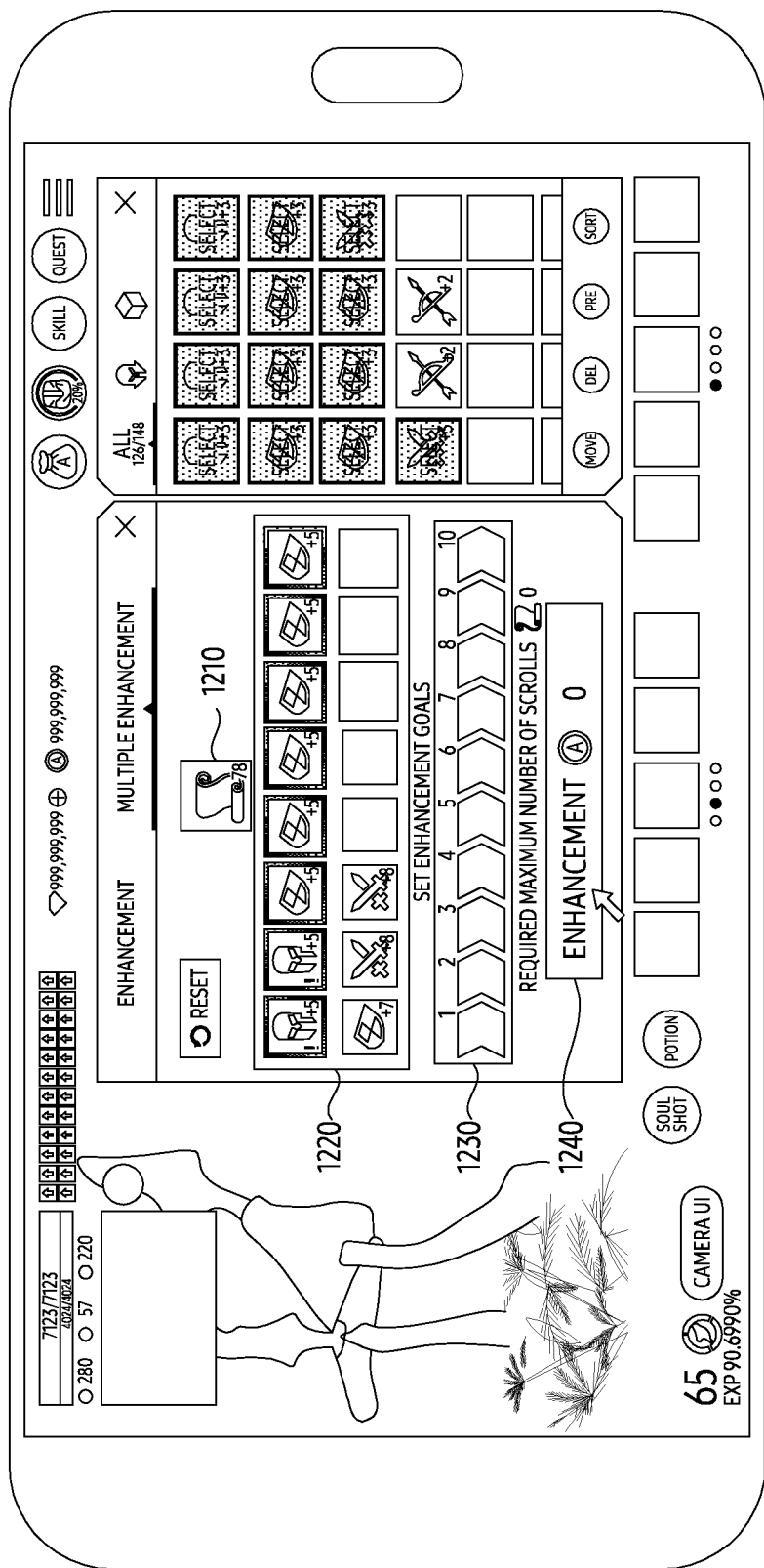

Then, as illustrated in FIG. 13G, as a result of performing the third round of enhancement, the enhancement levels of all items except for the lost items become level 5 or higher and the enhancement are then terminated, and the item previously inserted into the slot 3 is rearranged and then inserted to the place of the slot 2 previously left as an empty slot due to the lost item. Further, the items previously inserted into the slots 5 to 13 are also rearranged and then inserted to the positions of the slots 3 to 11.

FIGS. 14A to 14E are example views illustrating screens in which an item enhancement in game is performed according to other example embodiments.

Figure 14A:
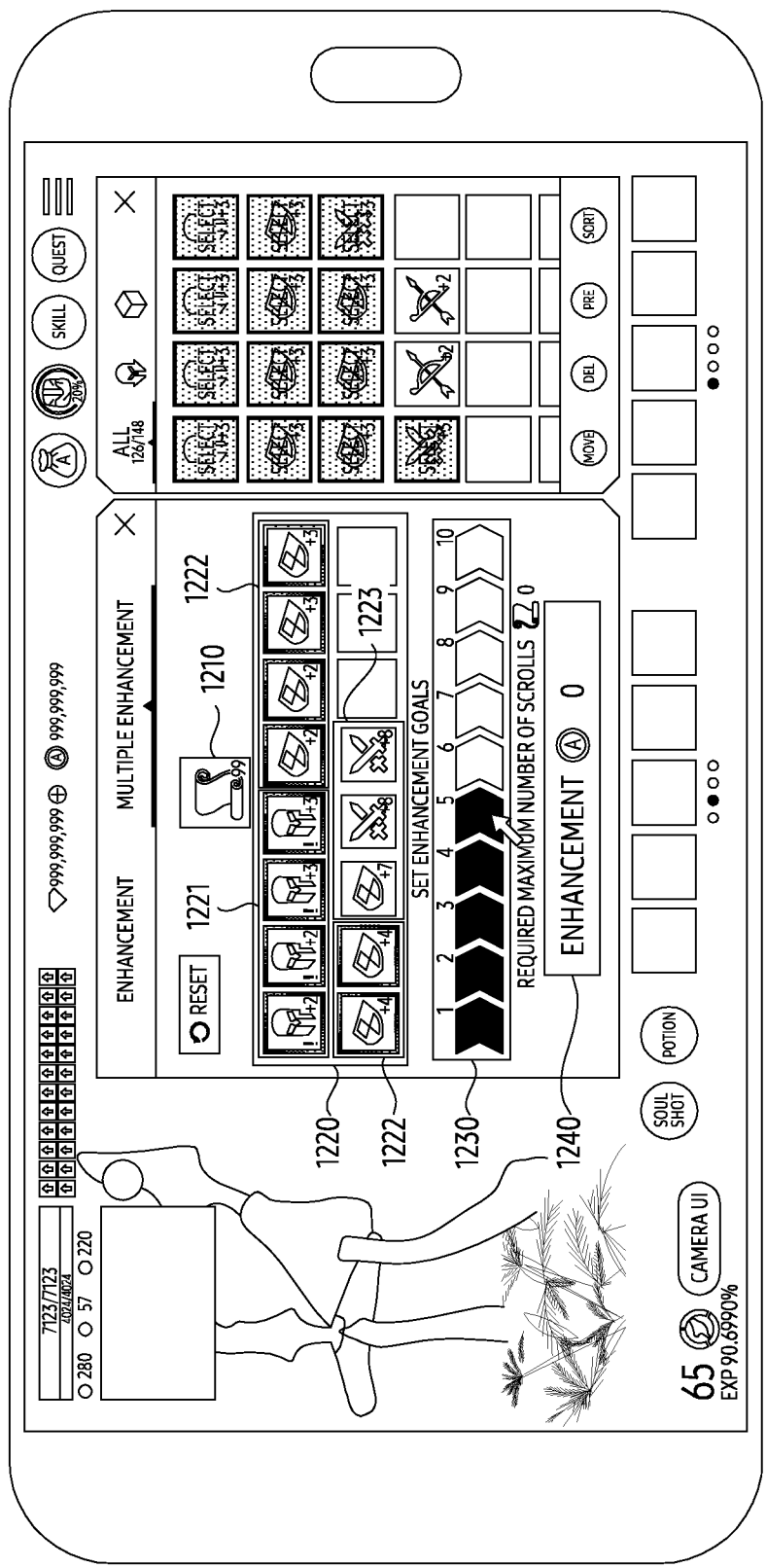
FIGS. 14A to 14E are example views illustrating a screen on which an item enhancement in game is performed according to embodiments.

As illustrated in FIG. 14A, the user may set the target enhancement level to level 5, using the target enhancement level setting interface 1230.

Figure 14B:
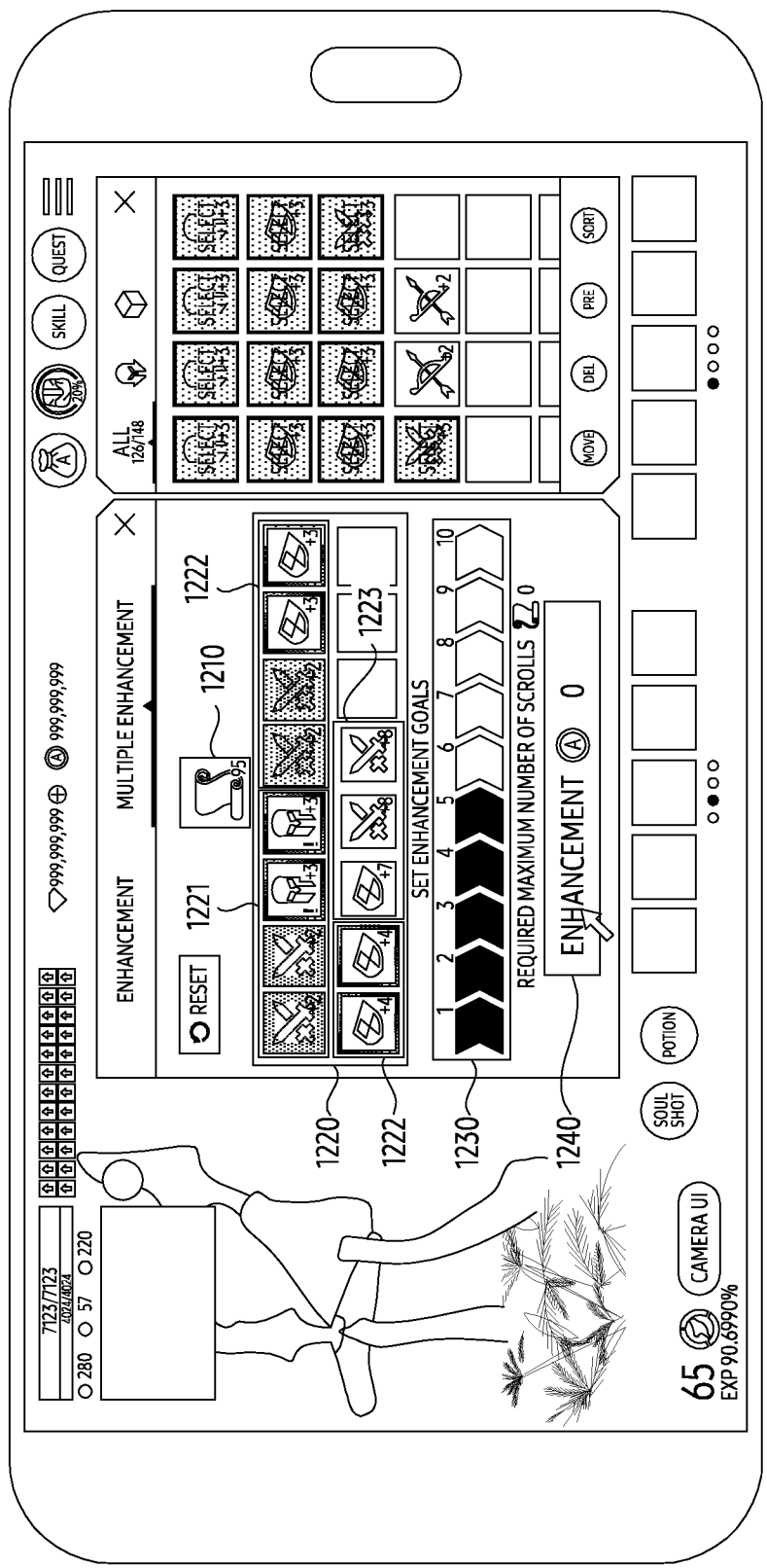

Then, as illustrated in FIG. 14B, when the user presses the enhancement button 1240, the graphic effect of a yellow light source indicating that the enhancement is in progress may be added to the inside of the icons of the items classified as the risk status (e.g., the items inserted in the slots 1 and 2) of the items with the current enhancement level of level 2, and the graphic effect of a blue light source indicating that the enhancement is in progress may be added to the inside of the icons of the items classified as the safety status (e.g., the items inserted in the slots 5 and 6) of the items with the current enhancement level of level 2. On the other hand, the items inserted into the slots 11 to 13 (1223) are classified as the enhancement exclusion status, and no enhancement is performed.

At this time, the enhancement is performed for a total of 4 items in the first round of enhancement, so the quantity of the orders inserted into the enhancement material item slot 1210 is subtracted by 4.

Figure 14C:
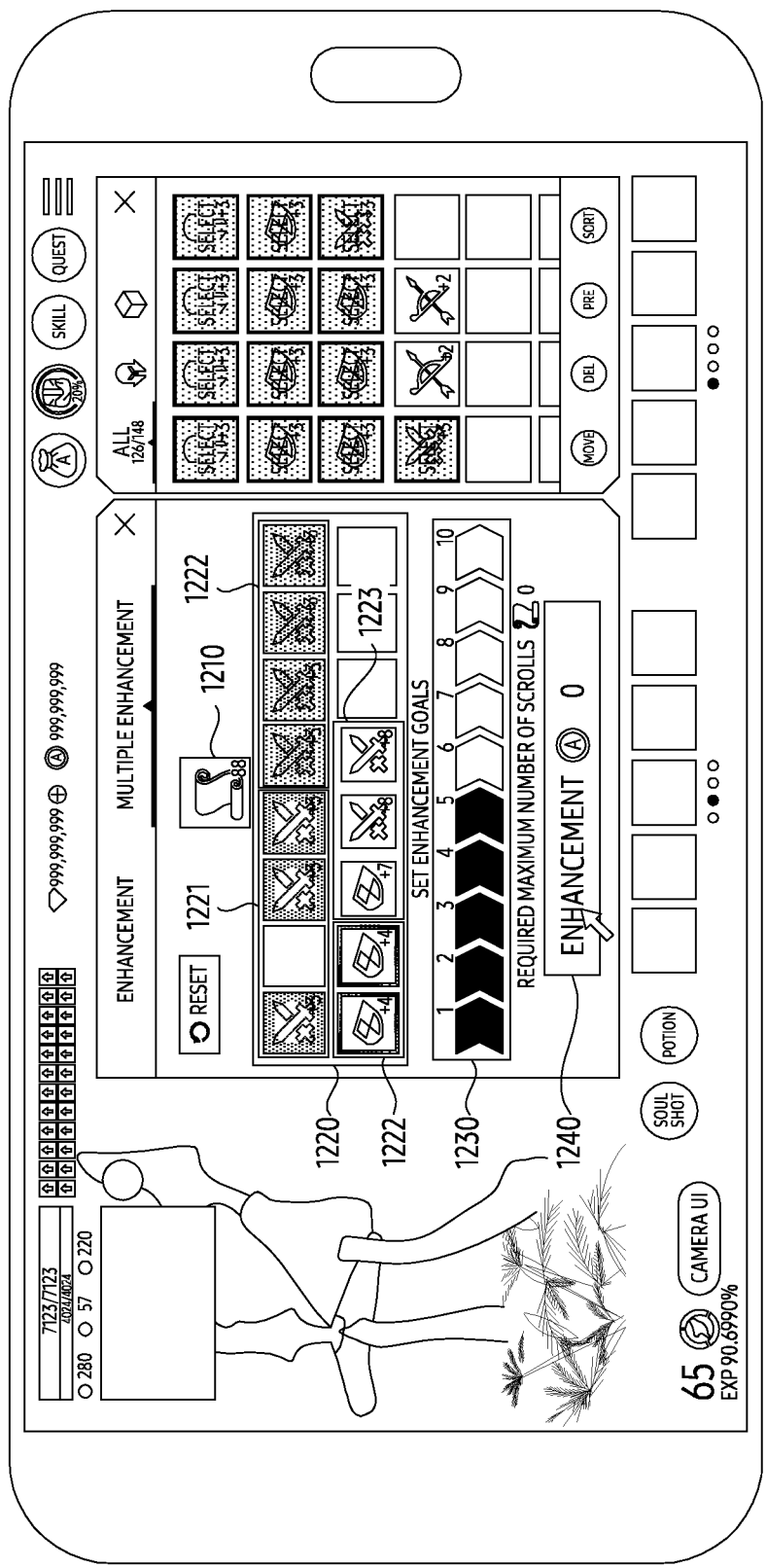

Referring to FIG. 14C, as a result of performing the first round of enhancement, it reveals that the item previously inserted into the slot 2 failed in enhancement and got lost, and the enhancement level of the items inserted into the slot 1 and the slots 3 to 10 increased by 1.

At this juncture, once the second round of enhancement is performed, the graphic effect of a yellow light source indicating that the enhancement is in progress may be added to the inside of the icons of the items classified as the risk status (e.g., the items inserted in the slots 1, 3, and 4) of the items with the current enhancement level of level 3, and the graphic effect of a blue light source indicating that the enhancement is in progress may be added to the inside of the icons of the items classified as the safety status (e.g., the items inserted in the slots 5 to 8) of the items with the current enhancement level of level 3.

In this second round of enhancement, the enhancement is performed for a total of 7 items, so the quantity of the orders inserted into the enhancement material item slot 1210 is further subtracted by 7.

Figure 14D:
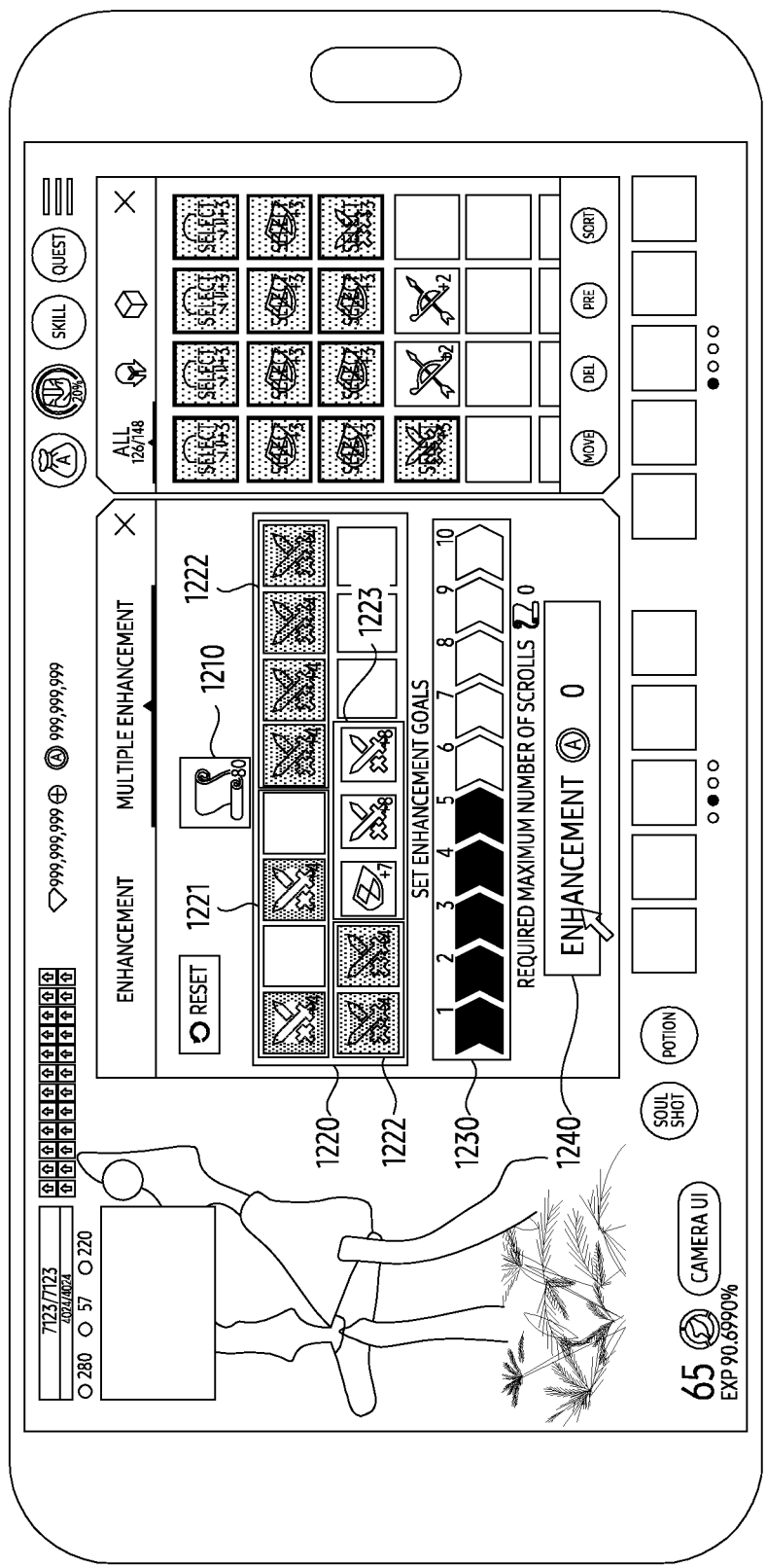

Referring to FIG. 14D, as a result of performing the second round of enhancement, it reveals that the item previously inserted into the slot 4 slot failed in enhancement and got lost, and the enhancement levels of the items inserted into the slots 1, 3, and 5 to 8 increased by 1.

Then, once the third round of enhancement is performed, the graphic effect of a yellow light source indicating that the enhancement is in progress may be added to the inside of the icons of the items classified as the risk status (e.g., the items inserted in the slots 1 and 3) among the items with the current enhancement level of level 4, and the graphic effect of a blue light source indicating that the enhancement is in progress may be added to the inside of the icons of the items classified as the safety status (e.g., the items inserted in the slots 5 to 10) among the items with the current enhancement level of level 4.

At this juncture, as the enhancement is performed for a total of 8 items in the third round of enhancement, the quantity of the orders inserted into the enhancement material item slot 1210 is further subtracted by 8.

Figure 14E:
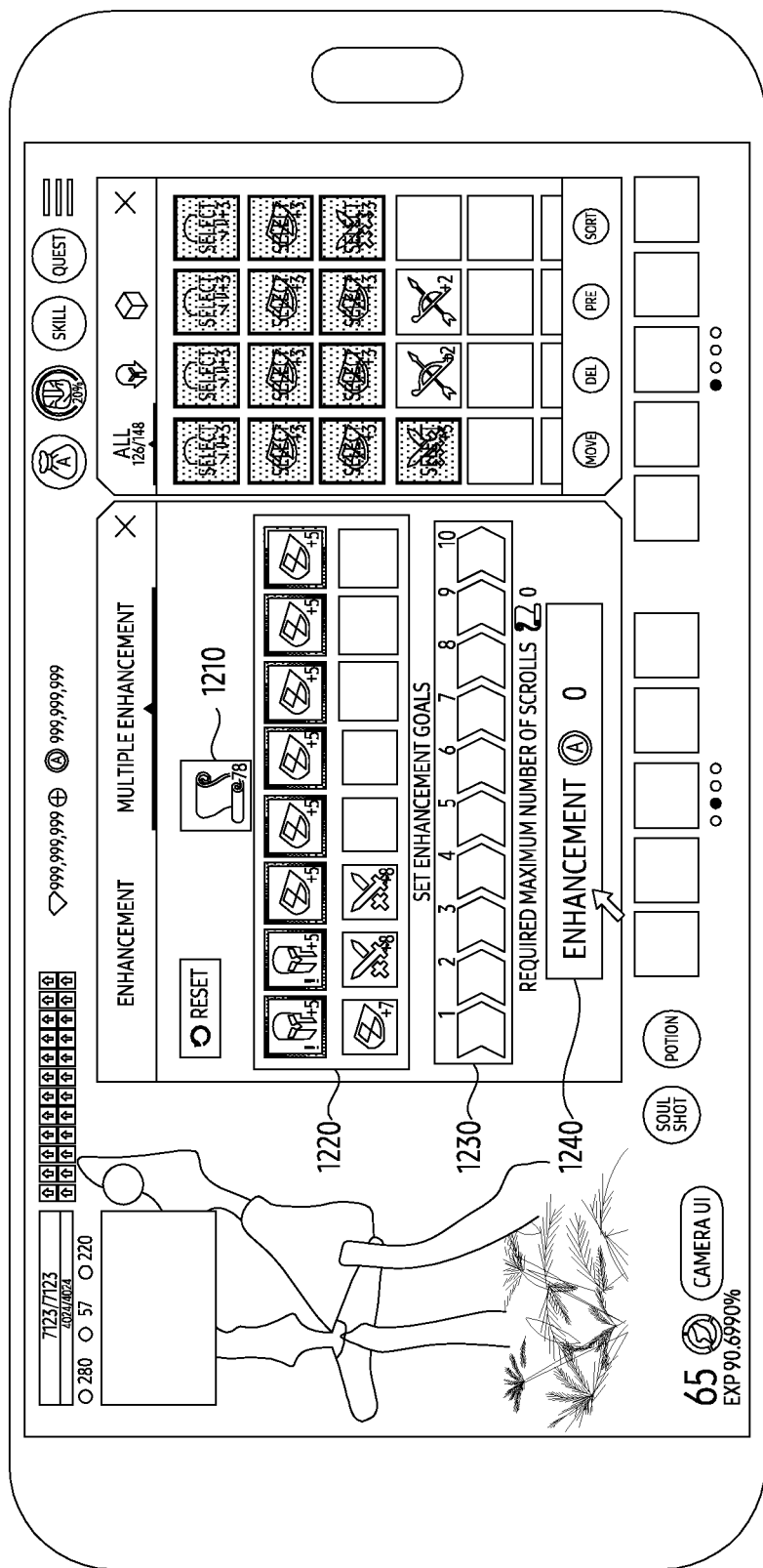

Then, as illustrated in FIG. 14E, as a result of performing the third round of enhancement, the enhancement level of all items except for the lost items became the level 5 or higher and the enhancement is then terminated, and the item previously inserted into the slot 3 is rearranged and inserted in the place of the slot 2 previously left as an empty slot due to the lost item. Further, the items previously inserted into the slots 5 to 13 are also rearranged and inserted into the positions of the slots 3 to 11.

As described above, in an embodiment, a non-transitory computer readable storage medium storing one or more programs comprises instructions which, when executed by at least one processor of an electronic device with a display, cause the electronic device to display, in a first area of a user interface for a game, a plurality of visual objects respectively indicating a plurality of items that are capable of enhancing in the game, via the display, to display, in a second area of the user interface next to the first area, the first visual objects, via the display in response to receiving first user inputs for selecting first visual objects from among the plurality of visual objects, to receive a second user input for executing the enhancement of the items while displaying with the first visual objects at least one second visual object indicating at least one resource for enhancement of items indicated by the first visual objects in the second area, to display at least one visual effect for representing that the enhancement of the items is being executed in response to receiving the second user input, and to display a result of the enhancement in the second area via the display after displaying the at least one visual effect, based at least in part on completion of the execution of the enhancement.

In an embodiment, the first visual objects in the first area that are respectively selected by the first user inputs are highlighted relative to at least one visual object except the first visual objects from among the plurality of visual objects.

For example, each of the first visual objects in the first area that are respectively selected by the first user inputs is highlighted by a visual element displayed along peripheries of each of the first visual objects, relative to the at least one visual object.

In an embodiment, the one or more programs comprise instructions which, when executed by the at least one processor of the electronic device, cause the electronic device to further display a bar-shaped visual object in the second area via the display, while the first visual objects and the at least one second visual object are displayed in the second area, and to display the at least one visual effect for representing that the enhancement of the items to the target enhancement level is being executed, in response to receiving the second user input after receiving a third user input for setting a target enhancement level of the items via the bar-shaped visual object.

For example, the bar-shaped visual object includes a plurality of visual elements respectively indicating a plurality of candidate enhancement levels, and the third user input is a user input setting a candidate enhancement level indicated by a visual element selected from among the plurality of visual elements to the target enhancement level.

For example, the visual element selected by the third user input is highlighted relative to at least one of remaining visual elements from among the plurality of visual elements.

For example, the bar-shaped visual object displayed in the second area is displayed under a plurality of slots in the second area into which the first visual objects respectively selected by the first user inputs are inserted, and is extended from a first position in the second area to a second position in the second area. Furthermore, the plurality of visual elements are displayed along a direction from the first position to the second position. Furthermore, a candidate enhancement level indicated by a visual element spaced a first distance from the first position from among the plurality of visual elements is lower than a candidate enhancement level indicated by a visual object spaced a second distance longer than the first distance from the first position from among the plurality of visual elements.

For example, the user interface includes a first tab for enhancement of one item from among the plurality of items and a second tab for enhancement of two or more items from among the plurality of items. Furthermore, the plurality of slots in the second area are defined in the user interface, based on a user input for selecting the second tab from among the first tab and the second tab.

For example, the one or more programs comprise instructions which, when executed by the at least one processor of the electronic device, cause the electronic device to display whether the target enhancement set by the third user input is a safe enhancement level or not in the second area via the display.

For example, the one or more programs comprise instructions which, when executed by the at least one processor of the electronic device, cause the electronic device to display the at least one visual effect including a visual effect indicating that at least one item from among the items disappears while executing the enhancement of the items to the target enhancement level, via the display, in response to receiving the second user input after receiving via the bar-shaped visual object the third user input for setting the target enhancement level that is not the safe enhancement level.

For example, the one or more programs comprise instructions which, when executed by the at least one processor of the electronic device, cause the electronic device to display, via the display, the result of the enhancement of the items to the target enhancement level in the second area by removing at least one visual object indicating the at least one item from among the first visual objects from the second area.

For example, the one or more programs comprise instructions which, when executed by the at least one processor of the electronic device, cause the electronic device to display, via the display, the result of the enhancement of the items to the target enhancement level in the second area by displaying remaining visual objects except the at least one visual object from among the first visual objects in the second area.

For example, at least one of the remaining visual objects is moved to a position where the at least one visual object removed from the second area has been displayed.

In an embodiment, the one or more programs comprise instructions which, when executed by the at least one processor of the electronic device, cause the electronic device to display, via the display, the result of the enhancement by displaying, in each of the first visual objects in the second area, information regarding an enhancement level of each of the items that is changed according to the enhancement of the items.

For example, the one or more programs comprise instructions which, when executed by the at least one processor of the electronic device, cause the electronic device to display, via the display, the result of the enhancement in the second area by displaying, in the at least one second visual object, information regarding remaining amounts of the at least one resource after completing the execution of the enhancement.

For example, the one or more programs comprise instructions which, when executed by the at least one processor of the electronic device, cause the electronic device to display, via the display, information regarding balance of virtual currency of a character in the game of a user of the electronic device, while displaying the first visual objects in the first area and the at least one second visual object after receiving the first user inputs.

For example, the one or more programs comprise instructions which, when executed by the at least one processor of the electronic device, cause the electronic device to further display, via the display, an executable object for executing the enhancement of the items in the second area, while displaying the first visual objects and the at least one second visual object in the second area, and to display, via the display, the at least one visual effect, in response to receiving the second user input on the executable object.

For example, the one or more programs comprise instructions which, when executed by the at least one processor of the electronic device, cause the electronic device to display, within the executable object, information regarding amount of virtual currency consumed for the enhancement, and to display, via the display, the at least one visual effect, in response to receiving the second user input on the executable object that includes the information regarding the amount of the virtual currency.

In an embodiment, each of the first visual objects displayed in the second area includes information regarding an enhancement level of each of the items before executing the enhancement.

In an embodiment, an enhancement of a first item with a first enhancement level from among the items is executed before an enhancement of a second item with a second enhancement level higher than the first enhancement level from among the items.

As described above, an electronic device according to an embodiment comprises at least one memory configured to store instructions, a display, and at least one processor, when executing the instructions, configured to display, in a first area of a user interface for a game, a plurality of visual objects respectively indicating a plurality of items that are capable of enhancing in the game, via the display, to display, in a second area of the user interface next to the first area, the first visual objects, via the display, in response to receiving first user inputs for selecting first visual objects from among the plurality of visual objects, to receive a second user input for executing the enhancement of the items while displaying with the first visual objects at least one second visual object indicating at least one resource for enhancement of items indicated by the first visual objects in the second area, to display at least one visual effect for representing that the enhancement of the items is being executed in response to receiving the second user input, and to display a result of the enhancement in the second area via the display after displaying the at least one visual effect, based at least in part on completion of the execution of the enhancement.

In an embodiment, the first visual objects in the first area that are respectively selected by the first user inputs are highlighted relative to at least one visual object except the first visual objects from among the plurality of visual objects.

For example, each of the first visual objects in the first area that are respectively selected by the first user inputs is highlighted by a visual element displayed along peripheries of each of the first visual objects, relative to the at least one visual object.

In an embodiment, the at least one processor is, when executing the instructions, configured to further display a bar-shaped visual object in the second area via the display, while the first visual objects and the at least one second visual object are displayed in the second area, and to display the at least one visual effect for representing that the enhancement of the items to the target enhancement level is being executed, in response to receiving the second user input after receiving a third user input for setting a target enhancement level of the items via the bar-shaped visual object.

For example, the bar-shaped visual object includes a plurality of visual elements respectively indicating a plurality of candidate enhancement levels, and the third user input is a user input setting a candidate enhancement level indicated by a visual element selected from among the plurality of visual elements to the target enhancement level.

For example, the visual element selected by the third user input is highlighted relative to at least one of remaining visual elements from among the plurality of visual elements.

For example, the bar-shaped visual object displayed in the second area is displayed under a plurality of slots in the second area into which the first visual objects respectively selected by the first user inputs are inserted, and is extended from a first position in the second area to a second position in the second area. Furthermore, the plurality of visual elements are displayed along a direction from the first position to the second position. Furthermore, a candidate enhancement level indicated by a visual element spaced a first distance from the first position from among the plurality of visual elements is lower than a candidate enhancement level indicated by a visual object spaced a second distance longer than the first distance from the first position from among the plurality of visual elements.

For example, the user interface includes a first tab for enhancement of one item from among the plurality of items and a second tab for enhancement of two or more items from among the plurality of items. Furthermore, the plurality of slots in the second area are defined in the user interface, based on a user input for selecting the second tab from among the first tab and the second tab.

For example, the at least one processor is, when executing the instructions, configured to display whether the target enhancement set by the third user input is a safe enhancement level or not in the second area via the display.

For example, the at least one processor is, when executing the instructions, configured to, in response to receiving the second user input after receiving via the bar-shaped visual object the third user input for setting the target enhancement level that is not the safe enhancement level, display the at least one visual effect including a visual effect indicating that at least one item from among the items disappears while executing the enhancement of the items to the target enhancement level, via the display.

For example, the at least one processor is, when executing the instructions, configured to display, via the display, the result of the enhancement of the items to the target enhancement level in the second area by removing at least one visual object indicating the at least one item from among the first visual objects from the second area.

For example, the at least one processor is, when executing the instructions, configured to display, via the display, the result of the enhancement of the items to the target enhancement level in the second area by displaying remaining visual objects except the at least one visual object from among the first visual objects in the second area.

For example, at least one of the remaining visual objects is moved to a position where the at least one visual object removed from the second area has been displayed.

In an embodiment, the at least one processor is, when executing the instructions, configured to display, via the display, the result of the enhancement by displaying, in each of the first visual objects in the second area, information regarding an enhancement level of each of the items that is changed according to the enhancement of the items.

For example, the at least one processor is, when executing the instructions, configured to display, via the display, the result of the enhancement in the second area by displaying, in the at least one second visual object, information regarding remaining amounts of the at least one resource after completing the execution of the enhancement.

In an embodiment, the at least one processor is, when executing the instructions, configured to display, via the display, information regarding balance of virtual currency of a character in the game of a user of the electronic device, while displaying the first visual objects in the first area and the at least one second visual object after receiving the first user inputs.

In an embodiment, the at least one processor is, when executing the instructions, configured to further display, via the display, an executable object for executing the enhancement of the items in the second area, while displaying the first visual objects and the at least one second visual object in the second area, and, in response to receiving the second user input on the executable object, to display, via the display, the at least one visual effect.

For example, the at least one processor is, when executing the instructions, configured to display, within the executable object, information regarding amount of virtual currency consumed for the enhancement, and, in response to receiving the second user input on the executable object that includes the information regarding the amount of the virtual currency, to display, via the display, the at least one visual effect.

In an embodiment, each of the first visual objects displayed in the second area includes information regarding an enhancement level of each of the items before executing the enhancement.

In an embodiment, an enhancement of a first item with a first enhancement level from among the items is executed before an enhancement of a second item with a second enhancement level higher than the first enhancement level from among the items.

As described above, a method for operating an electronic device with a display comprises displaying, in a first area of a user interface for a game, a plurality of visual objects respectively indicating a plurality of items that are capable of enhancing in the game, via the display, in response to receiving first user inputs for selecting first visual objects from among the plurality of visual objects, displaying, in a second area of the user interface next to the first area, the first visual objects, via the display, while displaying with the first visual objects at least one second visual object indicating at least one resource for enhancement of items indicated by the first visual objects in the second area, receiving a second user input for executing the enhancement of the items, in response to receiving the second user input, displaying at least one visual effect for representing that the enhancement of the items is being executed, and based at least in part on completion of the execution of the enhancement, displaying a result of the enhancement in the second area via the display after displaying the at least one visual effect.

In an embodiment, the first visual objects in the first area that are respectively selected by the first user inputs are highlighted relative to at least one visual object except the first visual objects from among the plurality of visual objects.

For example, each of the first visual objects in the first area that are respectively selected by the first user inputs is highlighted by a visual element displayed along peripheries of each of the first visual objects, relative to the at least one visual object.

In an embodiment, displaying the at least one visual effect comprises further displaying a bar-shaped visual object in the second area via the display, while the first visual objects and the at least one second visual object are displayed in the second area, and in response to receiving the second user input after receiving a third user input for setting a target enhancement level of the items via the bar-shaped visual object, displaying the at least one visual effect for representing that the enhancement of the items to the target enhancement level is being executed.

For example, the bar-shaped visual object includes a plurality of visual elements respectively indicating a plurality of candidate enhancement levels, and the third user input is a user input setting a candidate enhancement level indicated by a visual element selected from among the plurality of visual elements to the target enhancement level.

For example, the visual element selected by the third user input is highlighted relative to at least one of remaining visual elements from among the plurality of visual elements.

For example, the bar-shaped visual object displayed in the second area is displayed under a plurality of slots in the second area into which the first visual objects respectively selected by the first user inputs are inserted, and is extended from a first position in the second area to a second position in the second area. Furthermore, the plurality of visual elements are displayed along a direction from the first position to the second position. Furthermore, a candidate enhancement level indicated by a visual element spaced a first distance from the first position from among the plurality of visual elements is lower than a candidate enhancement level indicated by a visual object spaced a second distance longer than the first distance from the first position from among the plurality of visual elements.

For example, the user interface includes a first tab for enhancement of one item from among the plurality of items and a second tab for enhancement of two or more items from among the plurality of items, and the plurality of slots in the second area are defined in the user interface, based on a user input for selecting the second tab from among the first tab and the second tab.

For example, the method further comprises displaying whether the target enhancement set by the third user input is a safe enhancement level or not in the second area via the display.

For example, displaying the at least one visual effect comprises, in response to receiving the second user input after receiving via the bar-shaped visual object the third user input for setting the target enhancement level that is not the safe enhancement level, displaying the at least one visual effect including a visual effect indicating that at least one item from among the items disappears while executing the enhancement of the items to the target enhancement level, via the display.

For example, displaying the result of the enhancement comprises displaying, via the display, the result of the enhancement of the items to the target enhancement level in the second area by removing at least one visual object indicating the at least one item from among the first visual objects from the second area.

For example, displaying the result of the enhancement comprises displaying, via the display, the result of the enhancement of the items to the target enhancement level in the second area by displaying remaining visual objects except the at least one visual object from among the first visual objects in the second area.

For example, at least one of the remaining visual objects is moved to a position where the at least one visual object removed from the second area has been displayed.

For example, displaying the result of the enhancement comprises displaying, via the display, the result of the enhancement by displaying, in each of the first visual objects in the second area, information regarding an enhancement level of each of the items that is changed according to the enhancement of the items.

For example, displaying the result of the enhancement comprises displaying, via the display, the result of the enhancement in the second area by displaying, in the at least one second visual object, information regarding remaining amounts of the at least one resource after completing the execution of the enhancement.

In an embodiment, the method further comprises displaying, via the display, information regarding balance of virtual currency of a character in the game of a user of the electronic device, while displaying the first visual objects in the first area and the at least one second visual object after receiving the first user inputs.

In an embodiment, displaying the at least one visual effect comprises, further displaying, via the display, an executable object for executing the enhancement of the items in the second area, while displaying the first visual objects and the at least one second visual object in the second area, and, in response to receiving the second user input on the executable object, displaying, via the display, the at least one visual effect.

For example, displaying the at least one visual effect comprises displaying, within the executable object, information regarding amount of virtual currency consumed for the enhancement, and, in response to receiving the second user input on the executable object that includes the information regarding the amount of the virtual currency, displaying, via the display, the at least one visual effect.

In an embodiment, each of the first visual objects displayed in the second area includes information regarding an enhancement level of each of the items before executing the enhancement.

In an embodiment, an enhancement of a first item with a first enhancement level from among the items is executed before an enhancement of a second item with a second enhancement level higher than the first enhancement level from among the items.

According to various example embodiments, it is possible to add a graphic effect to distinguish an item with a risk of enhancement failure from an item that is safe in enhancement, thereby making game users clearly recognize the risk of such item enhancement failure before undertaking the enhancement.

Further, according to various embodiments disclosed herein, it is possible to enhance a plurality of items at once to a desired target enhancement level, thereby allowing the game users to be more interested in the game and play the game more efficiently.

Furthermore, according to various example embodiment, it is possible to set the order in which the enhancement is performed when enhancing a plurality of items, so that the game users may be provided with a more highlighted result of enhancement for their important items.

An embodiment of the disclosure may include a program for performing the methods described in this specification on a computer, and a computer-readable recording medium including the program. The computer-readable recording medium may include program instructions, local data files, local data structures, and so on, either alone or in combination thereof. The medium may be one specially designed and configured for the disclosure, or commonly used in the field of computer software. Examples of the computer-readable recording media may include magnetic media such as e.g., hard disks, floppy disks and magnetic tapes, optical recording media such as e.g., CD-ROMs and DVDs, and a hardware device such as e.g., ROMs, RAMs, flash memories, and the like, which are specially designed and configured to store and execute the program instructions. Examples of the program may include machine language codes such as those generated by a compiler as well as high-level language codes that may be executed by a computer using an interpreter or the like.

Although example embodiments of the disclosure have been described in detail heretofore, an expert skilled in the art to which the disclosure pertains will understand that various modifications of the disclosure may be made without departing from the scope of the disclosure. Therefore, the scope of the disclosure should not be limited to the above-described embodiments, but will be defined by the following claims and their equivalents.

What is claimed is:

1. A non-transitory computer readable storage medium storing one or more programs, the one or more programs comprising instructions which, when executed by at least one processor of an electronic device with a display, cause the electronic device to:
    display, in a first area of a user interface for a game, a plurality of visual objects respectively indicating a plurality of items that are capable of being enhanced in the game, via the display;
    in response to receiving first user inputs for selecting first visual objects from among the plurality of visual objects,
    display, in a second area of the user interface next to the first area, the first visual objects, via the display;
    while displaying, with the first visual objects, a bar-shaped visual object in which visual elements respectively indicating a plurality of reinforcement levels are arranged in a predetermined direction, in the second area, receive, via the bar-shaped visual object, a second user input for setting a target enhancement level of items indicated by the first visual objects;
    while displaying, with the first visual objects, at least one second visual object indicating at least one resource for enhancement of the items indicated by the first visual objects in the second area after receiving the second user input, receive a third user input for executing the enhancement of the items;
    in response to receiving the third user input, display at least one visual effect for representing that the enhancement of the items is being executed; and
    based at least in part on completion of execution of the enhancement, display a result of the enhancement according to the target enhancement level in the second area via the display after displaying the at least one visual effect.

2. The non-transitory computer readable storage medium of claim 1, wherein the first visual objects in the first area that are respectively selected by the first user inputs are highlighted relative to at least one visual object which is different from the first visual objects among the plurality of visual objects.

3. The non-transitory computer readable storage medium of claim 1,
    wherein the second area including the first visual objects and the bar-shaped visual object, includes at least one visual object for indicating that an item to be enhanced out of a safety enhancement section is included in the items, and
    wherein, before receiving the third user input after the second user input is received, the at least one visual object is included in the second area.

4. The non-transitory computer readable storage medium of claim 1, wherein the one or more programs further comprise instructions which, when executed by the at least one processor of the electronic device, cause the electronic device to:
display, via the display, the result of the enhancement by displaying, in each of the first visual objects in the second area, information regarding an enhancement level of each of the items that is changed according to the enhancement of the items.

5. The non-transitory computer readable storage medium of claim 1, wherein the one or more programs further comprise instructions which, when executed by the at least one processor of the electronic device, cause the electronic device to:
display, via the display, information regarding a balance of virtual currency of a character in the game of a user of the electronic device, while displaying the first visual objects in the first area and the at least one second visual object after receiving the first user inputs.

6. The non-transitory computer readable storage medium of claim 1, wherein the one or more programs further comprise instructions which, when executed by the at least one processor of the electronic device, cause the electronic device to:
further display, via the display, an executable object for executing the enhancement of the items in the second area, while displaying the first visual objects and the at least one second visual object in the second area; and
in response to receiving the third user input on the executable object, display, via the display, the at least one visual effect.

7. The non-transitory computer readable storage medium of claim 1, wherein an enhancement of a first item with a first enhancement level from among the items is executed before an enhancement of a second item with a second enhancement level higher than the first enhancement level from among the items.

8. An electronic device comprising:
at least one memory configured to store instructions;
a display; and
at least one processor, when executing the instructions, configured to:
display, in a first area of a user interface for a game, a plurality of visual objects respectively indicating a plurality of items that are capable of being enhanced in the game, via the display;
in response to receiving first user inputs for selecting first visual objects from among the plurality of visual objects, display, in a second area of the user interface next to the first area, the first visual objects, via the display;
while displaying, with the first visual objects, a bar-shaped visual object in which visual elements respectively indicating a plurality of reinforcement levels are arranged in a predetermined direction, in the second area, receive, via the bar-shaped visual object, a second user input for setting a target enhancement level of items indicated by the first visual objects;
while displaying, with the first visual objects, at least one second visual object indicating at least one resource for enhancement of the items indicated by the first visual objects in the second area after receiving the second user input, receive a third user input for executing the enhancement of the items;
in response to receiving the third user input, display at least one visual effect for representing that the enhancement of the items is being executed; and
based at least in part on completion of execution of the enhancement, display a result of the enhancement according to the target enhancement level in the second area via the display after displaying the at least one visual effect.

9. The electronic device of claim 8, wherein the first visual objects in the first area that are respectively selected by the first user inputs are highlighted relative to at least one visual object which is different from the first visual objects among the plurality of visual objects.

10. The electronic device of claim 8,
wherein the second area including the first visual objects and the bar-shaped visual object, includes at least one visual object for indicating that an item to be enhanced out of a safety enhancement section is included in the items, and
wherein, before receiving the third user input after the second user input is received, the at least one visual object is included in the second area.

11. The electronic device of claim 8, wherein the at least one processor is, when executing the instructions, further configured to:
display, via the display, the result of the enhancement by displaying, in each of the first visual objects in the second area, information regarding an enhancement level of each of the items that is changed according to the enhancement of the items.

12. The electronic device of claim 8, wherein the at least one processor is, when executing the instructions, further configured to:
display, via the display, information regarding a balance of virtual currency of a character in the game of a user of the electronic device, while displaying the first visual objects in the first area and the at least one second visual object after receiving the first user inputs.

13. The electronic device of claim 8, wherein the at least one processor is, when executing the instructions, further configured to:
further display, via the display, an executable object for executing the enhancement of the items in the second area, while displaying the first visual objects and the at least one second visual object in the second area; and
in response to receiving the third user input on the executable object, display, via the display, the at least one visual effect.

14. The electronic device of claim 8, wherein an enhancement of a first item with a first enhancement level from among the items is executed before an enhancement of a second item with a second enhancement level higher than the first enhancement level from among the items.

15. A method for operating an electronic device with a display, the method comprising:
displaying, in a first area of a user interface for a game, a plurality of visual objects respectively indicating a plurality of items that are capable of being enhanced in the game, via the display;
in response to receiving first user inputs for selecting first visual objects from among the plurality of visual objects, displaying, in a second area of the user interface next to the first area, the first visual objects, via the display;
while displaying, with the first visual objects, a bar-shaped visual object in which visual elements respectively indicating a plurality of reinforcement levels are arranged in a predetermined direction, in the second area, receiving, via the bar-shaped visual object, a second user input for setting a target enhancement level of items indicated by the first visual objects;
while displaying, with the first visual objects, at least one second visual object indicating at least one resource for enhancement of the items indicated by the first visual objects in the second area after receiving the second user input, receiving a third user input for executing the enhancement of the items;
in response to receiving the third user input, displaying at least one visual effect for representing that the enhancement of the items is being executed; and
based at least in part on completion of execution of the enhancement, displaying a result of the enhancement according to the target enhancement level in the second area via the display after displaying the at least one visual effect.

16. The method of claim 15, wherein the first visual objects in the first area that are respectively selected by the first user inputs are highlighted relative to at least one visual object which is different from the first visual objects among the plurality of visual objects.

17. The method of claim 15,
wherein the second area including the first visual objects and the bar-shaped visual object, includes at least one visual object for indicating that an item to be enhanced out of a safety enhancement section is included in the items, and
wherein, before receiving the third user input after the second user input is received, the at least one visual object is included in the second area.

18. The method of claim 15, wherein displaying the result of the enhancement comprises:
displaying, via the display, the result of the enhancement by displaying, in each of the first visual objects in the second area, information regarding an enhancement level of each of the items that is changed according to the enhancement of the items.

19. The method of claim 15, further comprising:
displaying, via the display, information regarding a balance of virtual currency of a character in the game of a user of the electronic device, while displaying the first visual objects in the first area and the at least one second visual object after receiving the first user inputs.

20. The method of claim 15, wherein displaying the at least one visual effect comprises:
further displaying, via the display, an executable object for executing the enhancement of the items in the second area, while displaying the first visual objects and the at least one second visual object in the second area; and
in response to receiving the third user input on the executable object, displaying, via the display, the at least one visual effect.

* * * * *